US012310299B2

(12) United States Patent
Lachapelle-Trouillard et al.

(10) Patent No.: US 12,310,299 B2
(45) Date of Patent: May 27, 2025

(54) CONTROLLED IRRIGATION PROCESS AND SYSTEM FOR LAND APPLICATION OF WASTEWATER

(71) Applicant: GROUPE RAMO INC., Saint-Roch-de-l'Achigan (CA)

(72) Inventors: Xavier Lachapelle-Trouillard, Laval (CA); Louis-Clément Barbeau, Montreal (CA); Francis Allard, St-Roch-De-L'achigan (CA); Olivier Payette, St-Roch-De-L'achigan (CA)

(73) Assignee: GROUPE RAMO INC., Quebec (CA)

( * ) Notice: Subject to any disclaimer, the term of this patent is extended or adjusted under 35 U.S.C. 154(b) by 22 days.

(21) Appl. No.: 18/508,324

(22) Filed: Nov. 14, 2023

(65) Prior Publication Data

US 2024/0074369 A1 Mar. 7, 2024

Related U.S. Application Data

(63) Continuation of application No. 17/831,687, filed on Jun. 3, 2022, now Pat. No. 11,856,901.

(Continued)

(51) Int. Cl.
*A01G 25/16* (2006.01)
*C02F 3/32* (2023.01)

(52) U.S. Cl.
CPC ............ *A01G 25/167* (2013.01); *C02F 3/327* (2013.01)

(58) Field of Classification Search
CPC ...... A01G 25/167; A01G 25/16; A01G 25/00; C02F 3/327; C02F 3/32; C02F 3/00
See application file for complete search history.

(56) References Cited

U.S. PATENT DOCUMENTS 5,947,041 A * 9/1999 Licht ...................... B09C 1/002
                                                  47/DIG. 3
6,719,488 B2 * 4/2004 Kuroda ................ G01N 33/245
                                                    405/36

(Continued)

FOREIGN PATENT DOCUMENTS

| CA | 2562831 A1 | 4/2007 |
| CA | 2627493 A1 | 5/2007 |

(Continued)

OTHER PUBLICATIONS

Hensley—"Using Tensiometer for measuring soil water and scheduling irrigation" by David Hensley Published Apr. 1999 (Year: 1999).*

(Continued)

*Primary Examiner* — David Colon-Morales
(74) *Attorney, Agent, or Firm* — George Likourezos; Carter, DeLuca & Farrell LLP

(57) ABSTRACT

Systems, processes and methods for controlling the irrigation of wastewater to a vegetated land are provided. The process can include determining a drained upper limit (DUL)-related criterion of an irrigation zone of the vegetated land, and obtaining a soil water tension measurement indicative of the irrigation status in the irrigation zone. The soil water tension measurement can then be compared to the DUL-related criterion, and when the soil water tension measurement of the irrigation zone is equal to or above the DUL-related criterion, an irrigation event characterized by a given volume of wastewater and a given irrigation duration can be initiated to irrigate the irrigation zone. The process can also include implementing a predetermined irrigation protocol in accordance with a set of predetermined parameters to irrigate the irrigation zone during an irrigation event, (Continued)

the set of predetermined parameters including for instance a DUL-related criterion for the irrigation zone.

20 Claims, 6 Drawing Sheets

Related U.S. Application Data

(60) Provisional application No. 63/196,849, filed on Jun. 4, 2021.

(56) References Cited

U.S. PATENT DOCUMENTS

| | | | | |
|---|---|---|---|---|
| 7,546,181 | B2* | 6/2009 | Vidovich | A01G 25/167 |
| | | | | 324/696 |
| 7,718,063 | B2* | 5/2010 | Jacquet | C02F 3/327 |
| | | | | 210/170.08 |
| 8,191,307 | B2* | 6/2012 | Donoghue | A01G 25/16 |
| | | | | 47/79 |
| 9,872,445 | B2* | 1/2018 | Cline | G06Q 10/0633 |
| 10,206,341 | B2* | 2/2019 | Micu | G05B 15/02 |
| 11,009,142 | B2* | 5/2021 | Emory | F16K 7/17 |
| 11,032,983 | B2* | 6/2021 | Etienne | H04N 5/33 |
| 11,297,785 | B2* | 4/2022 | Aughton | G05B 15/02 |
| 2007/0101461 | A1 | 5/2007 | Van Der Lelie et al. | |
| 2007/0187323 | A1 | 8/2007 | Williams, Jr. | |
| 2013/0276370 | A1 | 10/2013 | Licht | |
| 2015/0100169 | A1* | 4/2015 | McKinney | H04L 67/10 |
| | | | | 700/282 |
| 2015/0272017 | A1* | 10/2015 | Hedley | A01G 25/16 |
| | | | | 700/284 |
| 2015/0344338 | A1 | 12/2015 | Granley | |
| 2018/0368339 | A1 | 12/2018 | van der Lee | |
| 2020/0283316 | A1 | 9/2020 | Licht | |

FOREIGN PATENT DOCUMENTS

| | | |
|---|---|---|
| CA | 3035337 A1 | 3/2017 |
| RU | 2414314 C1 | 3/2011 |
| WO | 9858881 A1 | 12/1998 |
| WO | 0127033 A2 | 4/2001 |
| WO | 2011080578 A1 | 7/2011 |
| WO | 2020047587 A1 | 3/2020 |

OTHER PUBLICATIONS

FAO—"Irrigation with wastewater" by FAO Published since at least Feb. 2019 (Year: 2019).*
Alam—"Tensiometer use in scheduling irrigation" by Mahbub Alam Published Jul. 1997 (Year: 1997).*
Lachapelle, X., "Treatment and valorization of a primary municipal wastewater by a short rotation willow coppice vegetation filter", Ecological Engineering 130 (2019), pp. 32-44.
International Search Report and Written Opinion issued by the Canadian Intellectual Property Office in connection with International Application No. PCT/CA2022/050894, dated Jul. 20, 2022.
David Hensly, et al., "Using Tensiometers for Measuring Soil Water and Scheduling Irrigation", made public by the College of Tropical Agriculture & Human Resources, Univ. of Hawaii at Manoa, pp. 1-4, Apr. 1999.
Aimee Taniguchi, et al., "Making Irrigation Decisions Using Tensiometers", Cooperative Extension, University of Hawaii at Manoa, pp. 1-4, Aug. 2020.
FAO—"Irrigation with wastewater", by FAO Published since at least Feb. 2019.
Alam—"Tensiometer use in scheduling irrigation" by Mahbub Alam Published, Jul. 1997.

* cited by examiner

CONTROLLED IRRIGATION PROCESS AND SYSTEM FOR LAND APPLICATION OF WASTEWATER

CROSS-REFERENCE TO RELATED APPLICATION

The present application is a continuation of U.S. patent application Ser. No. 17/831,687, filed on Jun. 3, 2022, which claims priority from U.S. provisional patent application No. 63/196,849, filed on Jun. 4, 2021, and entitled "CONTROLLED IRRIGATION PROCESS AND SYSTEM FOR LAND APPLICATION OF WASTEWATER", the disclosure of which is hereby incorporated by reference in its entirety.

TECHNICAL FIELD

The technical field generally relates to techniques for treating wastewater. In particular, the technical field relates to techniques for controlling wastewater irrigation in land application systems.

BACKGROUND

Land application systems involve the application of wastewater to a vegetated land to treat wastewater and to provide a source of nutrients and irrigation water to the vegetation and contribute to its growth.

Management of wastewater can give rise to several challenges. For instance, one of these challenges relates to the increase in volume of wastewater that can occur when industries such as landfills and industrial sites expand their activities, and/or due to the increase in precipitation associated with climate change, and the lack of processing facilities designed to cope with such increases in volume of wastewater to be treated. Consequently, managing the excess wastewater often involves transporting the excess wastewater to another treatment site, which may not be desirable from an economic and environmental point of view.

Another one of these challenges relates to the tightening of regulatory requirements requiring the industries managing wastewater to improve the quality of reclaimed water and/or, and to enhance recovery of resources such as the water itself, and the nutrients that it contains, while reducing levels of metals and other contaminants.

Land application systems are typically operated passively and therefore can require a vegetated land having a large surface area, which may not be available, may be unattractive economically, and/or may prevent the use of a membrane to contain the irrigated wastewater. Such passive systems can also lead to an inadequate use of the resources that would be otherwise offered by the land application system, and an increased environmental risk associated with the potential leaching of contaminants, etc.

Furthermore, conventional irrigation technologies used in agriculture applications are typically aimed at maximizing plant yield by minimizing the amount of water applied, which is a strategy that can have drawbacks when seeking to increase the volume of wastewater applied to the vegetation of a land application system. Instrumentation devices used in agriculture applications can also be influenced by the salt content of the soil solution analyzed, which can render their use unsuitable for monitoring or controlling the irrigation of wastewater in a land application system due to the often high, or variable, salt content of the wastewater effluents.

Therefore, there remain a number of challenges with respect to the management of wastewater using land application system.

SUMMARY

In accordance with an aspect, there is provided a A process for controlling irrigation of wastewater to a vegetated land, comprising:
  determining a drained upper limit (DUL)-related criterion of an irrigation zone of the vegetated land; and
  obtaining a soil water tension measurement indicative of an irrigation status in the irrigation zone;
  wherein when the soil water tension measurement of the irrigation zone is equal to or above the DUL-related criterion, irrigating the irrigation zone with a given volume of wastewater during an irrigation event having a start irrigation time and an end irrigation time defining an irrigation duration, the given volume of wastewater being determined so as to maximize an amount of the wastewater applied to the vegetated land over time.

In some implementations, the process further comprises determining a differential between the soil water tension measurement and the DUL-related criterion.

In some implementations, the irrigation duration is adjustable in accordance with the differential between the soil water tension measurement and the DUL-related criterion.

In some implementations, the irrigation duration is adjustable to maintain the soil water tension measurement above the DUL-related criterion.

In some implementations, the given volume of wastewater is adjustable in accordance with the differential between the soil water tension measurement and the DUL-related criterion.

In some implementations, the given volume of wastewater is adjustable to maintain the soil water tension measurement above the DUL-related criterion.

In some implementations, the DUL-related criterion corresponds to a DUL of the irrigation zone to which is added a percentage of a difference between the DUL and a wilting point of the irrigation zone, the percentage being below 30%.

In some implementations, the DUL-related criterion corresponds to a DUL of the irrigation zone.

In some implementations, determining the DUL-related criterion comprises:
  determining a DUL of the irrigation zone, comprising:
  obtaining a series of soil water tension measurements on the irrigation zone during a series of characterized events;
  determining a soil tension loss of the irrigation zone following a test irrigation event performed when the irrigation zone is near the DUL; and
  adding the soil tension loss to the DUL to obtain the DUL-related criterion.

In some implementations, the DUL-related criterion correspond to "DUL+1 irrigation event".

In some implementations, the DUL-related criterion correspond to "DUL+x irrigation event".

In some implementations, x is greater than 1.

In some implementations, x is an integer or a number with a fractional component.

In some implementations, when the soil water tension measurement of the irrigation zone is equal to or above the DUL-related criterion, the given volume of wastewater applied during the irrigation event is increased by a factor corresponding to x.

In some implementations, when the soil water tension measurement of the irrigation zone is equal to or above the DUL-related criterion, and the irrigation duration is increased by a factor related to x.

In some implementations, the series of characterized events comprises at least one of a planned irrigation event or a rainfall event.

In some implementations, the process further comprises characterizing a soil sample from the irrigation zone during a startup phase to obtain a soil characterization profile of the soil sample.

In some implementations, the given volume of wastewater corresponds to a portion of a maximum daily irrigation volume of wastewater applicable to the irrigation zone.

In some implementations, the process further comprises determining a wastewater characterization profile of the wastewater to obtain information relative to a contaminant load of the wastewater.

In some implementations, the maximum daily irrigation volume of wastewater is determined at least in part according to the wastewater characterization profile.

In some implementations, the maximum daily irrigation volume of wastewater is determined at least in part according to the soil characterization profile.

In some implementations, obtaining the soil water tension measurement is performed using a tensiometer.

In some implementations, when the soil water tension measurement of the irrigation zone is below the DUL-related criterion, no wastewater is applied to the irrigation zone.

In some implementations, the vegetated land comprises a short rotation woody crop vegetation filter.

In some implementations, the irrigation zone comprises a plurality of irrigation zones, and the process further comprises:
  determining a corresponding DUL-related criterion for each irrigation zone of the plurality of irrigation zones; and
  obtaining a corresponding soil water tension measurement for each irrigation zone of the plurality of irrigation zones.

In some implementations, when more than one corresponding soil water tension measurement is above the corresponding DUL-related criterion, irrigating the irrigation zone having the largest differential between the corresponding soil water tension measurement and the corresponding DUL-related criterion.

In accordance with another aspect, there is provided a method for controlling irrigation of wastewater onto an irrigation zone of a vegetated land, comprising:
  establishing a predetermined irrigation protocol in accordance with a set of predetermined parameters to irrigate the irrigation zone during an irrigation event having a start irrigation time and an end irrigation time, the set of predetermined parameters comprising:
    an irrigation schedule corresponding to a time period during which irrigation is determined to be suitable; and
    an irrigation volume threshold indicative of a predetermined cumulative volume of wastewater applicable to the irrigation zone;
    and at least one of:
    a soaking time indicative of a delay between two successive irrigation events in a same irrigation zone;
    a rainfall intensity threshold at which or below which irrigation is determined to be suitable;
    a forecasted rainfall intensity; and
    a DUL-related criterion for the irrigation zone.

In accordance with another aspect, there is provided a process for controlling irrigation of wastewater onto an irrigation zone of a vegetated land, comprising:
  implementing a predetermined irrigation protocol in accordance with a set of predetermined parameters to irrigate the irrigation zone during an irrigation event having a start irrigation time and an end irrigation time defining an irrigation duration, the set of predetermined parameters comprising:
    an irrigation schedule corresponding to a time period during which irrigation is determined to be suitable;
    a soaking time indicative of a delay between two successive irrigation events in a same irrigation zone;
    an irrigation volume threshold indicative of a predetermined cumulative volume of wastewater applicable to the irrigation zone;
    a rainfall intensity threshold at which or below which irrigation is determined to be suitable; and
    a DUL-related criterion for the irrigation zone;
  wherein when at least one of the start irrigation time is outside of the irrigation schedule, a prior irrigation time is less than the soaking time, a total daily irrigation volume is equal or above the irrigation volume threshold, the rainfall intensity is above the rainfall intensity threshold, and a soil water tension measurement of the irrigation zone is below the DUL-related criterion, no irrigation of wastewater is provided to the irrigation zone; and
  wherein when the start irrigation time is within the irrigation schedule, the prior irrigation time is equal or more than the soaking time, the total daily irrigation volume is below the irrigation volume threshold, the rainfall intensity is below or equal to the rainfall intensity threshold, and the soil water tension measurement is equal to or above the DUL-related criterion, irrigating the irrigation zone with wastewater.

In some implementations, the process further comprises determining a wastewater characterization profile of the wastewater to obtain information relative to a contaminant load of the wastewater.

In some implementations, the irrigation volume threshold is determined at least in part according to the wastewater characterization profile.

In some implementations, determining the wastewater characterization profile of the wastewater comprises determining at least one of total suspended solids (TSS), a chemical oxygen demand (COD), a biological oxygen demand (BOD5), a total nitrogen (TN), a total Kjeldahl nitrogen (TKN), total phosphorus (TP), NOx, NH4, alkalinity, a pH, and an ionic compound concentration.

In some implementations, the irrigation schedule is determined according to a photoperiod representative of a time of year when the predetermined irrigation protocol is intended to be implanted.

In some implementations, the predetermined irrigation protocol automatically adjusts the photoperiod throughout the time of year.

In some implementations, the irrigation schedule is adjusted in accordance with availability of the wastewater to treat.

In some implementations, the process further comprises determining the DUL of the irrigation zone.

In some implementations, determining the DUL comprises obtaining a series of soil water tension measurements on the irrigation zone during a startup phase.

In some implementations, obtaining the series of soil water tension measurements on the irrigation zone during the startup phase is performed during a series of characterized events.

In some implementations, the series of characterized events comprises at least one of an irrigation event or a rainfall event that is significant enough to saturate the soil.

In some implementations, the process further comprises characterizing a soil sample from the irrigation zone during the startup phase to obtain the soil characterization profile of the soil sample.

In some implementations, the DUL is determined according to the series of characterized events and the soil characterization profile of the soil sample.

In some implementations, the soaking time is determined at least in part according to the soil characterization profile of the irrigation zone.

In some implementations, the irrigation volume threshold is determined at least in part according to a soil characterization profile of the irrigation zone.

In some implementations, the soil characterization profile comprises a granulometric characteristic.

In some implementations, determining the DUL further comprises validating the DUL at a given timepoint during the implementation of the predetermined irrigation protocol or following an additional rainfall event.

In some implementations, the soaking time is between 2 minutes and 60 minutes.

In some implementations, the irrigation duration is between 5 minutes and 60 minutes.

In some implementations, the irrigation duration period is determined such that the soil water tension remains above the DUL.

In some implementations, the predetermined irrigation protocol is repeated in alternance with the soaking time over a period of 24 hours.

In some implementations, the predetermined irrigation protocol is repeated between 0 times and 30 times over the period of 24 hours.

In accordance with another aspect, there is provided a process for controlling irrigation of wastewater onto an irrigation zone of a vegetated land, comprising:
  implementing a predetermined irrigation protocol in accordance with a set of predetermined parameters to irrigate the irrigation zone during an irrigation event having a start irrigation time and an end irrigation time defining an irrigation duration, the set of predetermined parameters comprising:
    an irrigation schedule corresponding to a time period during which irrigation is determined to be suitable;
    a soaking time indicative of a delay between two successive irrigation events in a same irrigation zone;
    an irrigation volume threshold indicative of a predetermined cumulative volume of wastewater applicable onto the irrigation zone; and
    a DUL-related criterion for the irrigation zone;
  wherein when at least one of the start irrigation time is outside of the irrigation schedule, a prior irrigation time is less than the soaking time, a total daily irrigation volume is equal or above the irrigation volume threshold, or a soil water tension measurement of the irrigation zone is below the DUL-related criterion, no irrigation of wastewater is provided to the irrigation zone; and
  wherein when the start irrigation time is within the irrigation schedule, the prior irrigation time is equal or more than the soaking time, the total daily irrigation volume is below the irrigation volume threshold, and the soil water tension measurement is equal to or above the DUL-related criterion, irrigating the irrigation zone with wastewater.

In some implementations, the set of predetermined parameters further comprises a rainfall intensity threshold at which or below which irrigation is determined to be suitable; and
  wherein when at least one of the start irrigation time is outside of the irrigation schedule, a prior irrigation time is less than the soaking time, a total daily irrigation volume is equal or above the irrigation volume threshold, a soil water tension measurement of the irrigation zone is below the DUL-related criterion, or the rainfall intensity is above the rainfall intensity threshold, no irrigation of wastewater is provided to the irrigation zone; and
  wherein when the start irrigation time is within the irrigation schedule, the prior irrigation time is equal or more than the soaking time, the total daily irrigation volume is below the irrigation volume threshold, the soil water tension measurement is equal to or above the DUL-related criterion, and the rainfall intensity is below or equal to the rainfall intensity threshold, irrigating the irrigation zone with wastewater.

In some implementations, the set of predetermined parameters further comprises a forecasted rainfall intensity threshold at which or below which irrigation is determined to be suitable; and
  wherein when at least one of the start irrigation time is outside of the irrigation schedule, a prior irrigation time is less than the soaking time, a total daily irrigation volume is equal or above the irrigation volume threshold, a soil water tension measurement of the irrigation zone is below the DUL-related criterion, the rainfall intensity is above the rainfall intensity threshold, or the forecasted rainfall intensity is above a forecasted rainfall intensity threshold in less than a given number of minutes, no irrigation of wastewater is provided to the irrigation zone; and
  wherein when the start irrigation time is within the irrigation schedule, the prior irrigation time is equal or more than the soaking time, the total daily irrigation volume is below the irrigation volume threshold, the soil water tension measurement is equal to or above the DUL-related criterion, the rainfall intensity is below or equal to the rainfall intensity threshold, and the forecasted rainfall intensity is equal or below the forecasted rainfall intensity threshold for a given number of minutes or the forecasted rainfall intensity is higher than the forecasted rainfall intensity threshold but after the given number of minutes, irrigating the irrigation zone with wastewater.

In some implementations, the process further comprises determining a wastewater characterization profile of the wastewater to obtain information relative to a contaminant load of the wastewater.

In some implementations, the irrigation volume threshold is determined at least in part according to the wastewater characterization profile.

In some implementations, determining the wastewater characterization profile of the wastewater comprises determining at least one of total suspended solids (TSS), a chemical oxygen demand (COD), a biological oxygen demand (BOD5), a total nitrogen (TN), a total Kjeldahl nitrogen (TKN), total phosphorus (TP), NOx, NH4, alkalinity, a pH, and an ionic compound concentration.

In some implementations, the irrigation schedule is determined according to a photoperiod representative of a time of year when the predetermined irrigation protocol is intended to be implanted.

In some implementations, the predetermined irrigation protocol automatically adjusts the photoperiod throughout the time of year.

In some implementations, the irrigation schedule is adjusted in accordance with availability of the wastewater to treat.

In some implementations, the process further comprises determining a DUL of the irrigation zone.

In some implementations, determining the DUL comprises obtaining a series of soil water tension measurements on the irrigation zone during a startup phase.

In some implementations, obtaining the series of soil water tension measurements on the irrigation zone during the startup phase is performed during a series of characterized events.

In some implementations, the series of characterized events comprises at least one of an irrigation event or a rainfall event that is significant enough to saturate the soil.

In some implementations, the process further comprises characterizing a soil sample from the irrigation zone during the startup phase to obtain the soil characterization profile of the soil sample.

In some implementations, the DUL is determined according to the series of characterized events and the soil characterization profile of the soil sample.

In some implementations, the soaking time is determined at least in part according to the soil characterization profile.

In some implementations, the irrigation volume threshold is determined at least in part according to a soil characterization profile of the irrigation zone.

In some implementations, the soil characterization profile comprises a granulometric characteristic.

In some implementations, determining the DUL further comprises validating the DUL at a given timepoint during the implementation of the predetermined irrigation protocol or following an additional rainfall event.

In some implementations, the soaking time is between 2 minutes and 60 minutes.

In some implementations, the irrigation duration is between 5 minutes and 60 minutes.

In some implementations, the irrigation duration period is determined such that the soil water tension remains above the DUL.

In some implementations, the predetermined irrigation protocol is repeated in alternance with the soaking time over a period of 24 hours.

In some implementations, the predetermined irrigation protocol is repeated between 0 times and 30 times over the period of 24 hours.

In accordance with another aspect, there is provided a process for controlling irrigation of wastewater onto an irrigation zone of a vegetated land, comprising:
implementing a predetermined irrigation protocol in accordance with a set of predetermined parameters to irrigate the irrigation zone during an irrigation event having a start irrigation time and an end irrigation time defining an irrigation duration, the set of predetermined parameters comprising:
an irrigation schedule corresponding to a time period during which irrigation is determined to be suitable;
a soaking time indicative of a delay between two successive irrigation events in a same irrigation zone;
an irrigation volume threshold indicative of a predetermined cumulative volume of wastewater applicable onto the irrigation zone; and
a rainfall intensity threshold at which or below which irrigation is determined to be suitable;
wherein when at least one of the start irrigation time is outside of the irrigation schedule, a prior irrigation time is less than the soaking time, a total daily irrigation volume is equal or above the irrigation volume threshold, and the rainfall intensity is above the rainfall intensity threshold, no irrigation of wastewater is provided to the irrigation zone; and
wherein when the start irrigation time is within the irrigation schedule, the prior irrigation time is equal or more than the soaking time, the total daily irrigation volume is below the irrigation volume threshold, and the rainfall intensity is below or equal to the rainfall intensity threshold, irrigating the irrigation zone with wastewater.

In accordance with another aspect, there is provided a process for controlling irrigation of wastewater onto an irrigation zone of a vegetated land, comprising:
implementing a predetermined irrigation protocol in accordance with a set of predetermined parameters to irrigate the irrigation zone during an irrigation event having a start irrigation time and an end irrigation time defining an irrigation duration, the set of predetermined parameters comprising:
an irrigation schedule corresponding to a time period during which irrigation is determined to be suitable;
a soaking time indicative of a delay between two successive irrigation events in a same irrigation zone; and
an irrigation volume threshold indicative of a predetermined cumulative volume of wastewater applicable onto the irrigation zone; and
wherein when at least one of the start irrigation time is outside of the irrigation schedule, a prior irrigation time is less than the soaking time, and a total daily irrigation volume is equal or above the irrigation volume threshold, no irrigation of wastewater is provided to the irrigation zone; and
wherein when the start irrigation time is within the irrigation schedule, the prior irrigation time is equal or more than the soaking time, and the total daily irrigation volume is below the irrigation volume threshold, irrigating the irrigation zone with wastewater.

In accordance with another aspect, there is provided a system for controlling irrigation of wastewater onto a vegetated land comprising an irrigation zone, comprising:
a pumping station comprising a pump in fluid communication with a wastewater source for supplying the wastewater to the irrigation zone;
an irrigation network in fluid communication with the pump for supplying a volume of the wastewater to the irrigation zone;
a control station comprising a controller operatively connected to the pump; and a soil water tension measuring device for measuring a soil water tension of the irrigation zone, the soil water tension measuring device being operatively connected to the controller to transmit data from the soil water tension measuring device to the controller, the controller being further configured to evaluate the soil water tension with respect to a drained upper limit and to initiate an irrigation event when the soil water tension measurement of the irrigation zone is equal to or above the drained upper limit.

In some implementations, the controller is configured to provide instruction to the pump regarding an irrigation duration of the irrigation event.

In some implementations, the irrigation network comprises a surface irrigation system for supplying the wastewater to the irrigation zone.

In some implementations, the surface irrigation system comprises a surface drip system.

In some implementations, the surface irrigation system comprises a micro-sprinkler system.

In some implementations, the micro-sprinkler system comprises a pivot irrigation system or a boom irrigation system.

In some implementations, the irrigation network further comprises a pipeline fluidly connecting the pump with the surface irrigation system.

In some implementations, the irrigation network comprises an underground irrigation system for supplying the wastewater to the irrigation zone.

In some implementations, the underground irrigation system comprises a buried drip system.

In some implementations, the irrigation network further comprises a pipeline fluidly connecting the pump with the underground irrigation system.

In some implementations, the irrigation network further comprises an in-line pressure sensor configured to measure an upstream pressure of the irrigation network.

In some implementations, the in-line pressure sensor is further configured to monitor hydraulic properties of the irrigation network.

In some implementations, the in-line pressure sensor is operatively connected to the pump to stop operation of the pump when the upstream pressure is above or below a given pressure threshold.

In some implementations, the irrigation network further comprises a flowmeter configured to measure a flow of wastewater flowing in the irrigation network.

In some implementations, the flowmeter is further configured to measure the volume of irrigated wastewater supplied to the irrigation zone.

In some implementations, the irrigation network further comprises an irrigation valve provided upstream of the irrigation zone, the irrigation valve being configured to modulate the volume of wastewater supplied to the irrigation zone.

In some implementations, the system further comprises a weather station comprising a weather monitoring instrument.

In some implementations, the weather monitoring instrument comprises one or more of a temperature sensor, a humidity sensor, a rain gauge, a solar radiation probe and an anemometer.

In some implementations, the weather monitoring instrument is a rain gauge to measure a rainfall intensity.

In some implementations, the rain gauge is operatively connected to the controller, and the controller is further configured to adjust the volume of wastewater supplied to the irrigation zone in accordance with the rainfall intensity.

In some implementations, the controller is configured to process at least one signal generated by the weather station.

In some implementations, the controller is configured to process at least one signal generated by the pumping station.

In some implementations, the controller is configured to process at least one signal generated by the soil water tension measuring device.

In some implementations, the system further comprises a memory configured to store information representative of at least one of a past irrigation status of the irrigation zone, an ongoing irrigation status of the irrigation or a forecasted irrigation status of the irrigation zone.

In some implementations, the memory is integrated to the controller.

In some implementations, the memory is in data communication with the controller.

In some implementations, the memory is further configured to store calibration data.

In some implementations, the calibration data is representative of control parameters of at least one of the pumping station and the soil tension measuring device.

In some implementations, the system further comprises a user interface configured to control the system through the control station.

In some implementations, the user interface is a graphical user interface.

In some implementations, the user interface is part of a web-based application.

In some implementations, the user interface is part of a cloud-based platform.

In some implementations, the system further comprises a prediction module in data communication with the control station, the prediction module being configured to output an estimate of the soil water tension based on information representative of at least one of weather conditions, actual soil tension or hydraulic loading to be applied.

In some implementations, the estimate of the soil water tension is representative of an instantaneous soil water tension.

In accordance with another aspect, there is provided a controller for a system for controlling irrigation of wastewater onto a vegetated land, the vegetated land comprising an irrigation zone, the controller being in data communication with a pumping station comprising a pump, the controller being configured to:
  determine a soil water tension of the irrigation zone with respect to a drained upper limit; and
  send instructions to the pump of the pumping station to initiate an irrigation event when the soil water tension measurement of the irrigation zone is equal to or above the drained upper limit.

In some implementations, the controller is further configured to obtain data from the pumping station.

In some implementations, the controller is further configured to process at least one signal generated by the pumping station.

In some implementations, the system further includes a weather station, the controller being further configured to obtain data from the weather station.

In some implementations, the controller is further configured to process at least one signal generated by the weather station.

In some implementations, the system further includes a soil water tension measuring device, the controller being further configured to obtain data from the soil water tension measuring device.

In some implementations, the controller is further configured to process at least one signal generated by the soil water tension measuring device.

In accordance with another aspect, there is provided a process for controlling irrigation of wastewater to a vegetated land, comprising:
obtaining a soil water tension measurement indicative of the irrigation status in the irrigation zone;
wherein when the soil water tension measurement of the irrigation zone is equal to or above a DUL-related criterion, irrigating the irrigation zone with a given volume of wastewater during an irrigation event having a start irrigation time and an end irrigation time defining an irrigation duration, the given volume of wastewater being determined so as to maximize an amount of the wastewater applied to the vegetated land over time.

In some implementations, the process further comprises determining a differential between the soil water tension measurement and the DUL-related criterion.

In some implementations, the irrigation duration is adjustable in accordance with the differential between the soil water tension measurement and the DUL-related criterion.

In some implementations, the irrigation duration is adjustable to maintain the soil water tension measurement above the DUL-related criterion.

In some implementations, the given volume of wastewater is adjustable in accordance with the differential between the soil water tension measurement and the DUL-related criterion.

In some implementations, the given volume of wastewater is adjustable to maintain the soil water tension measurement above the DUL-related criterion.

In some implementations, the DUL-related criterion corresponds to a DUL of the irrigation zone to which is added a percentage of a difference between the DUL and a wilting point of the irrigation zone, the percentage being below 30%.

In some implementations, the DUL-related criterion corresponds to a DUL of the irrigation zone.

In some implementations, determining the DUL-related criterion comprises:
determining a DUL of the irrigation zone, comprising:
obtaining a series of soil water tension measurements on the irrigation zone during a series of characterized events;
determining a soil tension loss of the irrigation zone following a test irrigation event performed when the irrigation zone is near the DUL; and
adding the soil tension loss to the DUL to obtain the DUL-related criterion.

In some implementations, the DUL-related criterion correspond to "DUL+1 irrigation event".

In some implementations, the DUL-related criterion correspond to "DUL+x irrigation event".

In some implementations, x is greater than 1.

In some implementations, x is an integer or a number with a fractional component.

In some implementations, when the soil water tension measurement of the irrigation zone is equal to or above the DUL-related criterion, the given volume of wastewater applied during the irrigation event is increased by a factor corresponding to x.

In some implementations, when the soil water tension measurement of the irrigation zone is equal to or above the DUL-related criterion, and the irrigation duration is increased by a factor related to x.

In some implementations, the series of characterized events comprises at least one of a planned irrigation event or a rainfall event.

In some implementations, the process further comprises characterizing a soil sample from the irrigation zone during a startup phase to obtain a soil characterization profile of the soil sample.

In some implementations, the given volume of wastewater corresponds to a portion of a maximum daily irrigation volume of wastewater applicable to the irrigation zone.

In some implementations, the process further comprises determining a wastewater characterization profile of the wastewater to obtain information relative to a contaminant load of the wastewater.

In some implementations, the maximum daily irrigation volume of wastewater is determined at least in part according to the wastewater characterization profile.

In some implementations, the maximum daily irrigation volume of wastewater is determined at least in part according to the soil characterization profile.

In some implementations, obtaining the soil water tension measurement is performed using a tensiometer.

In some implementations, when the soil water tension measurement of the irrigation zone is below the DUL-related criterion, no wastewater is applied to the irrigation zone.

In some implementations, the vegetated land comprises a short rotation woody crop vegetation filter.

In some implementations, the irrigation zone comprises a plurality of irrigation zones, and the process further comprises:
determining a corresponding DUL-related criterion for each irrigation zone of the plurality of irrigation zones; and
obtaining a corresponding soil water tension measurement for each irrigation zone of the plurality of irrigation zones.

In some implementations, when more than one corresponding soil water tension measurement is above the corresponding DUL-related criterion, irrigating the irrigation zone having the largest differential between the corresponding soil water tension measurement and the corresponding DUL-related criterion.

In some implementations, the process, method, system and/or controller further comprises one or more features as defined herein.

BRIEF DESCRIPTION OF THE DRAWINGS

The figures of the present application illustrate various features, aspects and implementations of the technology described herein.

DETAILED DESCRIPTION

Figure 1:
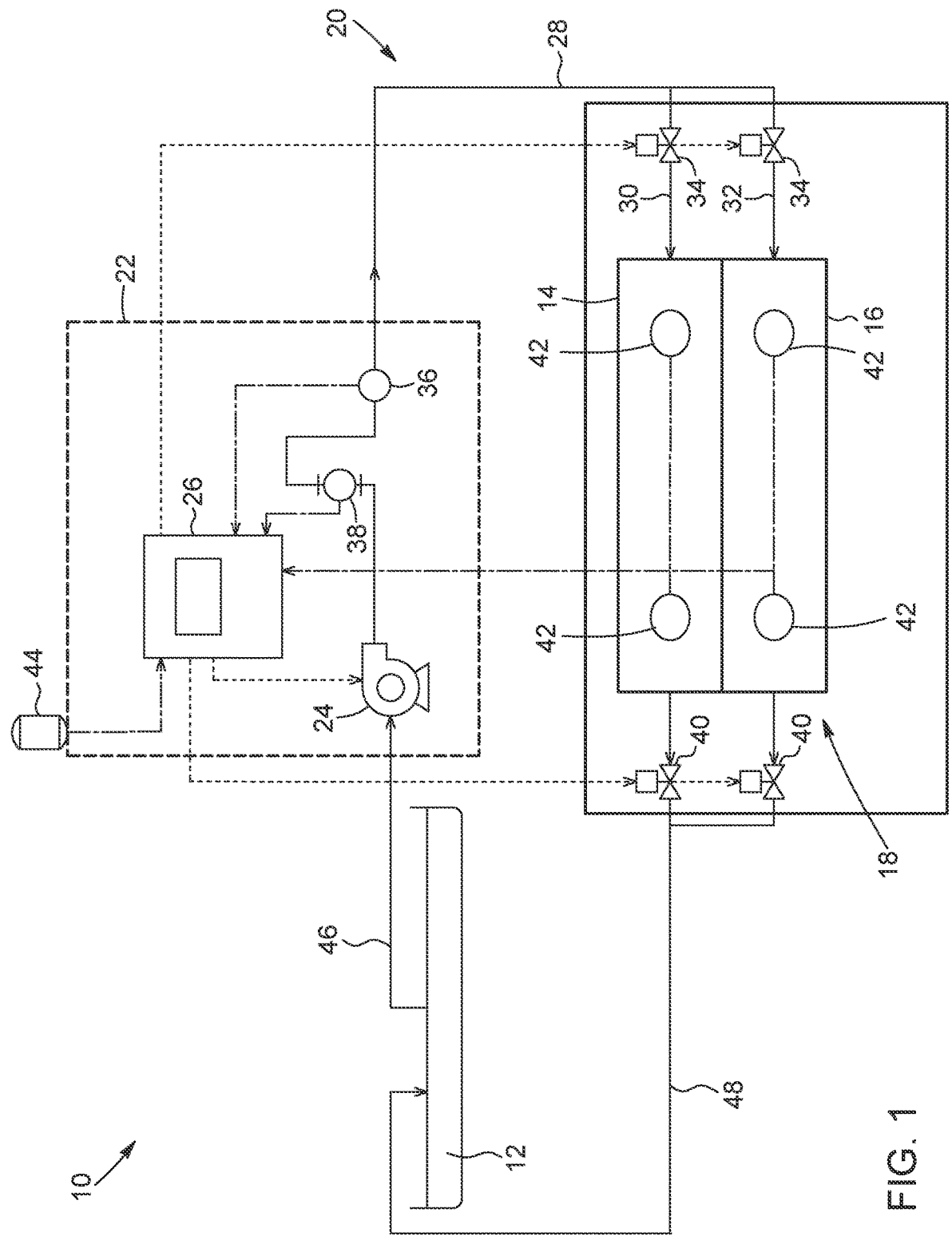
FIG. 1 is a schematic representation of a system for controlling the irrigation of a wastewater effluent to a vegetated land, in accordance with an implementation, the system including a pumping station, a control station, and a weather station.

Techniques described herein relate to processes and systems for controlling the irrigation of a wastewater effluent that contains contaminants to a vegetated land, or vegetated soil surface, as a means to treat the wastewater effluent while producing a source of valuable biomass. Controlling the application of a wastewater effluent via a predetermined irrigation protocol in the context of a land application system can achieve various objectives, such as enhancing evapotranspiration of the vegetation forming the vegetated land, reducing runoff and percolation of the irrigated wastewater into the soil, and perpetuating the effectiveness of the treatment process by controlling the contaminant loading applied to the vegetated land.

In accordance with the techniques described herein, controlling the application of a wastewater effluent to an irrigation zone of a vegetated land as part of a land application system can include establishing a predetermined irrigation protocol in accordance with a set of various predetermined parameters to control the irrigation of an irrigation zone during an irrigation event. The set of predetermined parameters can include for instance one or more of an irrigation schedule corresponding to a time period during which irrigation is determined to be indicated, a soaking time indicative of a delay between two successive irrigation events in a same irrigation zone, an irrigation volume threshold (or a maximum daily irrigation volume) applicable onto the irrigation zone, a rainfall intensity threshold at which or below which irrigation is determined to be indicated, and a drained upper limit of the irrigation zone. These predetermined parameters can be evaluated at least against data representative of the irrigation status of the irrigation zone to determine whether an irrigation event is to be initiated or not.

When the set of predetermined parameters listed above are included in a predetermined irrigation protocol, implementing the predetermined irrigation protocol can include evaluating if at least one of the start irrigation time is outside of the irrigation schedule, a prior irrigation time is less than the soaking time, a total daily irrigation volume is equal or above the irrigation volume threshold, the rainfall intensity is above the rainfall intensity threshold, and a soil water tension measurement of the irrigation zone is below the drained upper limit, in which case it can be determined that an irrigation event is not to be initiated and that no irrigation of wastewater is to be provided to the irrigation zone.

Alternatively, when the start irrigation time is within the irrigation schedule, the prior irrigation time is equal or more than the soaking time, the total daily irrigation volume is below the irrigation volume threshold, the rainfall intensity is below or equal to the rainfall intensity threshold, and the soil water tension measurement is equal to or above the drained upper limit, it can be determined that an irrigation event is to be initiated to irrigate the irrigation zone with wastewater.

Although various parameters are mentioned above, the irrigation protocol can also include a selection of these parameters or additional parameters, as the irrigation protocol can be adapted for a given application land.

In accordance with the techniques described herein, a key parameter influencing the decision to initiate an irrigation event or not and thus for controlling the irrigation of wastewater to a vegetated land is the soil water tension of the irrigation zone. The soil water tension can be monitored at a given location in the irrigation zone to obtain a soil water tension measurement that is subsequently compared to a drained upper limit of the irrigation zone. In some implementations, when the soil water tension measurement of the irrigation zone is equal or above the drained upper limit, an irrigation event can be initiated to irrigate the irrigation zone with a given volume of wastewater. The given volume of wastewater can be determined to maximize the volume of wastewater applied to the vegetated land over a period of time while reducing drainage out of the root zone of the vegetation, and can depend on factors such as the ability of the vegetation of the vegetated land to treat the wastewater via phytoremediation mechanisms, the evapotranspiration efficacy of the vegetation, and the soil characteristics.

Various implementations and features of the controlled wastewater irrigation process and system will now be described in greater detail in the following paragraphs.

General Overview of a Land Application System

A land application system involves the application of a wastewater effluent to a vegetated land using various irrigation techniques such as surface irrigation or subsurface irrigation. Land application of a wastewater effluent can provide several benefits, including providing a source of irrigation water and nutrients, such as nitrogen and phosphorus, to the vegetation of the vegetated land, offering an economical alternative to wastewater treatment by leveraging both the availability of such wastewater as a source of irrigation and the availability of vegetated land to receive the wastewater, providing an alternative to costly infrastructures required to treat wastewater, and an opportunity to treat wastewater having certain contaminants that would be otherwise difficult to treat in conventional facilities.

In the context of the present description, the term "wastewater" can refer to any source of water that includes various levels of contaminants and that is known in the art as being considered suitable for land application systems. Examples of wastewater can include wastewater derived from farming activities, municipal wastewater, domestic wastewater, wastewater derived from industrial activities, sewage sludge, etc. The wastewater can be analyzed prior to being applied to the vegetated land to ensure that the concentration of contaminants, or other characteristics of the wastewater, falls within certain ranges to determine whether the wastewater is suitable to be supplied to the vegetated land as an irrigation source. The wastewater can be pre-treated prior to being applied to the vegetated land, for instance to reduce the concentrations of certain contaminants.

Similarly, the vegetated land and soil suitability to receive the wastewater can depend on properties that can have the potential to impact human or environmental health, for instance because of surface erosion or downward movement of contaminants through the soil. The site properties and soil characteristics can thus be assessed prior to initiating operations involving the application of wastewater to determine if the site is suitable as a land application system. Such characterization can include for instance determining the primary direction of surface drainage and the presence of slopes as properties of the site itself, and determining soil properties such as the pH, particle size distribution, permeability, porosity, density, clay content, etc.

A land application system takes advantage of the ability of the vegetation and soil to perform vegetative uptake via evapotranspiration and thus reduce the volume of wastewater. Evapotranspiration combines evaporation and transpiration mechanisms. Evaporation occurs when liquid water is converted to water vapour and removed from an evaporation surface, which can include the soil surface and the surface of the plant, including the leaves. The evaporation is dependent on factors such as solar radiation, which can be influenced by the extent of the vegetation canopy. Transpiration involves the vaporization of liquid water contained in plant tissues and the vapour removal to the atmosphere following water take up by the roots and transport through the plant. The vaporization occurs within the leaf, in the intercellular spaces, and the transpiration then occurs through small openings in the plant leaf called stomata. Evapotranspiration thus represents the sum of these two types of water removal by the vegetation to the atmosphere.

Furthermore, the application of the wastewater effluent to the vegetated land surface enables treatment of the wastewater effluent as it flows through the plant root system and the soil matrix through various phytoremediation mechanisms. For instance, the plant can absorb contaminants such as nitrogen, potassium and phosphorus as inorganic nutrients. In particular, ammoniacal nitrogen can be absorbed by plants roots or more likely, be nitrified to nitrate nitrogen by soil microorganisms and then be absorbed by plant roots. The root of the plant can also absorb other contaminants such as metals, e.g., Cd, Cr, Cu, Hg, Ni, Pb, and Zn to prevent their release to the environment through percolation and runoff. In addition, vegetation, microorganisms and soil can contribute to reducing chemical oxygen demand (COD) concentrations, and biological oxygen demand ($BOD_5$) concentrations, and ammonia concentrations in the water present in soil pores. Organic matter can be removed by biological oxidation, filtration and adsorption mechanisms.

Various factors can influence the performance of a land application system. Examples of these factors include the nature of the wastewater, the characteristics of the soil, particularly its structure and permeability, prevailing winds, which assist evapotranspiration processes, the presence of shade which also influence evapotranspiration processes, existing vegetation, etc. A land application system can thus be designed to find a balance between treatment of the wastewater and growth needs of the vegetation through evapotranspiration and percolation.

The vegetation of the land application system can be chosen so as to produce biomass that may or may not have an economic value. In some instances, the vegetation can simply be ornamental, while in others, the biomass produced can be harvested and used for various applications. An example of a suitable vegetation for use in a land application system is a short rotation willow coppice (SRWC) vegetation filter. Willow beds have high rates of evapotranspiration, provide a biomass having an economic value, are non-edible, and have a high nitrogen and some metal absorption capacity. In addition, willow beds have nitrogen, phosphorus and potassium proportional requirements similar to the proportion of these nutrients typically found in municipal wastewater, making SRWC vegetation filters appealing for the treatment of this type of wastewater effluent. It is to be noted that a short rotation wood coppice can also be referred to as a SRWC.

Although a SRWC vegetation filter has been described above as an example of vegetation for a land application system, it is to be understood that any type of vegetation known in the art for use in the context of land application systems can be suitable for implementing the techniques described herein. Any fast-growing tree species, and particularly those having a high evapotranspiration rate and enhanced tolerance of their root system to anaerobic conditions, can be a type of vegetation of choice for implementing a land application system suitable operated according to the techniques described herein, since these characteristics can facilitate the application of large amounts of wastewater to the vegetated land. Rapid root, stem and leaf growth can also provide rapid uptake of nutrients such as nitrogen and phosphorous and of water. Populus, bamboos, and eucalypts are additional examples of short-rotation woody species that can be suitable for land application systems, among others. Any high evapotranspiration plants can also be suitable.

In some implementations, short rotation coppice of fast-growing tree species can be particularly suitable, as this type of culture can provide several benefits given the rapid root, stem and leaf growth of the vegetation. An example of a benefit provided by short rotation coppice of fast-growing tree species is that the crop can be harvested according to shorter harvest cycles and subsequently be quickly replaced, given the ability of some short rotation coppice to resprout from stumps after being harvested. Another example of benefit of short rotation coppice of fast-growing tree species is that it can produce biomass that is valuable economically at a rapid rate.

As mentioned above, conventional techniques for applying wastewater to a vegetated land are typically passive, and generally involve irrigating the vegetated at a constant daily hydraulic loading rate. These passive land application systems may not be suitable for enhancing evapotranspiration when wastewater applied to the vegetated land is below the evapotranspiration capacity of the vegetation, which translates in a suboptimal use of the vegetation resources. On the other hand, supplying a constant volume of wastewater to the vegetated land can result in saturated soil conditions, and thus in water runoff and deep percolation. In addition, passive management of a land application system does not take into consideration constraints related to the treatment efficiency of the process, such as the capacity of the soil to degrade organic matter or to nitrify the ammoniacal nitrogen brought by the wastewater effluent.

Actively controlling the irrigation of wastewater in the context of a land application system can contribute to overcome some of these drawbacks.

Controlled Application of Wastewater to an Irrigation Zone of a Vegetated Land

Processes and systems for controlling the application of a wastewater effluent to an irrigation zone of a vegetated land will now be described in further detail.

With reference to FIG. 1, a schematic representation of a controlled irrigation system 10 that can be implemented to control the irrigation of a wastewater effluent from a wastewater source 12 to an irrigation zone 14 of a vegetated land 18 via an irrigation network 20 is shown. In the illustrated implementation, a first irrigation zone 14 and a second irrigation zone 16 are shown.

It is to be noted that the vegetated land 18 can also be referred to as a "vegetation filter", and that these two expressions are used interchangeably in the present description. In accordance with the concepts described above, a vegetation filter can be defined as is a plant-based treatment system that involves phytoremediation strategies for treating wastewater through fast-growing woody trees and/or herbaceous perennials, relying on soil attenuation capacity, biological degradation, and plant uptake to remove contaminants from the wastewater.

Considerations when selecting the type of vegetation for the vegetated land can include root depths, irrigation requirements, growth cycle, and competition with other vegetation, to name a few. The choice of vegetation can also be performed according to the nutrient needs of the vegetation of interest, to ensure that the wastewater that will eventually be supplied to the vegetation promote growth of the vegetation without addition of extraneous fertilizers while maintaining a satisfactory yield with respect to biomass production.

An irrigation zone 14, 16 can be defined as an area of the vegetated land 18 that includes at least one monitoring device 42 for monitoring a property indicative of an irrigation status of the irrigation zone, and that is supplied with a controlled amount, which can be expressed as a volume, of wastewater. In some implementations, the irrigation zone can be supplied with a controlled amount of wastewater independently of an adjacent irrigation zone. The interaction between the data collected by the monitoring device 42 regarding the irrigation status of the irrigation zone and the resulting controlled application of wastewater as an irrigation source for the irrigation zone can facilitate applying an amount of wastewater for that given irrigation zone that is suitable for its evapotranspiration capacity and/or treatment capacity, among other factors.

The determination of an area of the vegetated land that can be suitable for forming an irrigation zone can depend on the homogeneity of soil characteristics over the vegetated land. Examples of soil characteristics can include for instance particle size distribution, permeability, porosity, density, and clay content, or any other soil characteristic that can contribute to influence soil oxygenation and the retention of the irrigated wastewater by the soil. When the soil of the vegetated land is considered heterogenous, the number of irrigation zones can be increased, with each irrigation zone being provided with at least one monitoring device. By increasing the number of irrigation zones, each monitoring device can collect data indicative of the irrigation status for a given section of the vegetated land that is considered somewhat homogenous, and be supplied with a controlled amount of wastewater in accordance with the data collected by the monitoring device. In other words, the vegetated land can be divided in a given number of irrigation zones that are determined as being substantially homogenous in terms of their sol characteristics, with at least one monitoring device being provided per irrigation zone. Providing more than one monitoring device per irrigation zone can contribute to obtaining data as representative as possible of the entire irrigation zone, which in turn can facilitate the control of the irrigation of that specific irrigation zone. This aspect will be described in further detail below.

In other implementations, the soil characteristics can be substantially homogenous over the entire vegetated land, and the segmentation of the vegetated land into irrigation zones can depend on the optimization of the wastewater distribution over the vegetated land. For instance, the wastewater supply network, or irrigation network, can be designed to supply wastewater to a certain area of the vegetated land, and such surface area would correspond to an irrigation zone.

Thus, an irrigation zone as described herein can be described as any section of a vegetated land for which controlled irrigation can be achieved via the use of a monitoring device collecting data that is indicative of the irrigation status of the irrigation zone, and subsequent application of a controlled amount of wastewater determined at least in part in accordance with the collected data.

The wastewater source 12 can be any type of containment structure configured for holding a certain volume of wastewater that can then be supplied to an irrigation zone via the irrigation network 20. In some implementations, the containment structure can be a holding tank. As the availability of the wastewater as a source of irrigation water may vary over time depending on the industries or operations supplying it, the containment structure can be configured to be oversized to hold an additional volume of wastewater that would enable satisfactory supply to the irrigation zones over a given period of time to ensure that water needs of the vegetation are met. In some implementations, the wastewater source 12 includes a float switch operating in an on/off manner to indicate to the pump 24 that enough wastewater is available to initiate an irrigation event, or alternatively that not enough wastewater is available to initiate an irrigation event.

As mentioned above, any source of water that includes contaminants and that is considered suitable for land application systems can be used as wastewater for the controlled irrigation system 10 described herein. Examples of wastewater can include wastewater derived from farming activities, municipal wastewater, domestic wastewater, sewage sludge, landfill leachate, etc. A step of wastewater characterization can be performed to evaluate the suitability of the wastewater to be applied as irrigation water, and/or to obtain a wastewater characterization profile that can be subsequently used to modulate operating parameters of the controlled irrigation system. Examples of characteristics of the wastewater can include for instance and without being limitative, COD, $BOD_5$, TSS, TN, TP, pH, and concentrations of elements such as Ca, Mg, K, Na, $SO_4$ and Cl.

In some implementations, obtaining the wastewater characterization profile can enable to adapt the contaminant loading applied to the irrigation zone. For instance, if it is determined that the concentration of one or more contaminants of a given wastewater effluent is higher than a predetermined threshold, one parameter that can be modified is the volume of wastewater applied to the irrigation zone, i.e., the volume of wastewater applied to the irrigation zone can be reduced in accordance with the treatment capacity of the irrigation zone to reduce the contaminant loading of the irrigation zone. Alternatively, if it is determined that a first wastewater has a concentration of one or more contaminants that is higher than a predetermined threshold, a given volume of the first wastewater can be diluted with a second wastewater having a lower concentration of contaminants to achieve a lower overall contaminant loading for the combination of the first and second wastewater compared to if the first wastewater was applied alone.

In some implementations, the wastewater can be pretreated prior to being applied to the vegetated land, for instance to reduce the concentrations of certain contaminants.

Determining whether the wastewater is suitable for application to the irrigation zone can involve obtaining a soil characterization profile. Similarly to what is mentioned above regarding the selection of areas of the vegetated land as irrigation zones, obtaining a soil characterization profile can include determining a physical property and/or a chemical property of a soil sample that is representative of the soil in a given irrigation zone. A physical property of a soil sample can include for instance the proportion of sand, silt and/or clay contained in the soil sample, the texture of the soil sample, the coefficient of uniformity of the soil sample, the coefficient of curvature of the soil sample, the bulk density of the soil sample, the porosity of the soil sample, the total available water and the saturated hydraulic conductivity, among others. A chemical property of the soil sample can include for instance its content in organic matter, its content in total organic carbon, and a concentration of elements such as $NH_4^+$, NOx, P, Al, Fe, Ca, Mg and K, among others. It is to be understood that these physical and chemical properties are given as examples only, and that the properties analyzed as part of the determination of the soil characterization profile can vary and be adapted depending on the vegetated land, the wastewater characterization profile, and/or the goals that are desired to be achieved by the implementation of the controlled irrigation system.

In some implementations, the vegetated land can be a confined vegetated land. A confined vegetated land is one that includes a semi-permeable or an impermeable barrier, such as a geomembrane, that is configured to contain wastewater from travelling downward into the soil past a certain depth, or to reach other bodies of water via contaminant migration. A confined vegetative land can also be delineated by a berm. In other implementations, the vegetated land can be an unconfined vegetated land. Examples of unconfined vegetated land can include a vegetated land can be provided on a top surface of a former landfill, such as a former waste containment area or an abandoned mine site. The type of vegetation grown on the vegetated land can depend on the characteristics of the vegetated land, i.e., whether the vegetated land is a confined vegetated land versus an unconfined vegetated land. For instance, when the vegetated land is provided on a top surface of a former landfill, the vegetation can be chosen such that the roots of the plants do not damage the integrity of the cap of the landfill.

Pumping Station, Control Station and Weather Station

Still referring to FIG. 1, in the implementation shown, the controlled irrigation system 10 further includes a pumping station 22 that includes at least one pump 24, a control station 26, and a weather station 44. The pump 24 is in fluid communication with the irrigation network 20 via a supply pipeline 46. The irrigation network 20 includes an irrigation pipeline 28 connected to the pump 24 to transport the wastewater to the irrigation zone(s), and a plurality of sub-pipelines 30, 32.

The irrigation pipeline 28 can have various configurations and be made of various materials depending on the characteristics and volume of wastewater to transport to the irrigation zones. In the implementations shown, the irrigation pipeline 28 is divided into a first sub-pipeline 30 and a second sub-pipeline 32, the first sub-pipeline 30 being configured for supplying wastewater to the first irrigation zone 14 and the second sub-pipeline 32 being configured for supplying wastewater to the second irrigation zone 16. It is to be understood that the term "pipeline" can refer to a tubing, or any structure enabling the transport of the wastewater to the irrigation zone.

As mentioned above, the supplying of the wastewater to each of the irrigation zones via corresponding sub-pipelines can facilitate controlling the volume of wastewater according to specific characteristics of the irrigation zone, and more particularly according to the data collected by the monitoring device 42 associated with that irrigation zone. Although each one of the sub-pipelines 30, 32 are illustrated as a single pipeline in FIG. 1, it is to be understood that each sub-pipeline 30, 32 can include one or more ramifications, for instance to provide uniform irrigation over the surface area of the irrigation zone. The configuration of the sub-pipeline 30, 32 can also change depending on the type of irrigation chosen. In some implementations, the irrigation of wastewater can be performed via surface irrigation or via underground irrigation. Examples of systems for performing surface irrigation include surface drip systems and micro-sprinkler systems. An example of a system for performing underground irrigation is a buried drip system. The sub-pipelines 30, 32 shown in FIG. 1 are thus illustrated as a single line transporting the wastewater for illustrative purposes only. It is to be understood that more than one sub-pipeline can be used to supply a controlled volume of wastewater to a corresponding irrigation zone, and that a sub-pipeline can correspond to a surface irrigation system and/or a subsurface irrigation system, or any other type of irrigation system.

The pump 24 can be for instance a centrifugal pump, or any other suitable type of pump. The pump 24 supplies wastewater to the irrigation zone(s) via the irrigation network 20. In some implementations, a single pump can be provided to supply a controlled volume of wastewater to respective irrigation zones. Alternatively, more than one pump can be provided, for instance with a pump being provided for a given number of irrigation zones and for a vegetated land that includes more than the given number of irrigation zones.

To prevent water hammers in the irrigation network 20, irrigation valves 34 can be opened a certain period of time prior to the starting the pump 24, and be closed a certain period of time after the pump 24 is turned off.

In some implementations, the pumping station 22 further includes a variable frequency drive (VFD) for controlling the operation of the pump 24. The VFD can enable the pump 24 to gradually increase its pressure, which can also contribute to avoid water hammers. The VFD can also be used to modulate the operating flow rate.

In the illustrated implementation, and in-line pressure sensor 36 and a flowmeter 38 are provided as instrumentation for transmitting information regarding the wastewater flowing in the irrigation network 20.

The flowmeter 38 is configured to measure the flow of wastewater flowing in the irrigation network 20, and indirectly, volumes of irrigated wastewater and associated contaminant loadings. The flow rate provided by the flowmeter 38, which can be expressed for instance in $m^3/h$, can be converted to a volume of irrigated wastewater per irrigation event, with volumes of irrigated water being summed to obtain a total volume of wastewater applied per day, or per another unit of time, which can be expressed for instance in $m^3$. The total volume of wastewater applied per day can be a parameter of a predetermined irrigation protocol to determine whether an additional irrigation event can be initiated or not. In some implementations, the information provided by the flowmeter 38 regarding the flow rate of wastewater circulating in the irrigation network 20 can be used as a safety parameter. For instance, if the flowmeter 38 shows a low flow rate in the irrigation network 20, this can be indicative of a clogging at a given location in the irrigation network 20, whereas if the flowmeter shows a high flow rate in the irrigation network 20, this can be indicative of a leak in the irrigation network 20.

The pressure sensor 36 can be installed on the main supply line of the irrigation network 20, i.e., the irrigation pipeline 28, downstream of the pump 24, to measure the upstream pressure of the irrigation network 20. The pressure sensor 36 can be used to monitor the hydraulic properties of the irrigation network 20. In some implementations, the pressure of the irrigation network 20 provided by the pressure sensor can act as a safety parameter, with the pump 24 ceasing its action if the pressure is above a given pressure threshold, which could indicate leakage in the irrigation network 20, and if the pressure is below a given pressure threshold, which could indicate clogging in the irrigation network 20.

Although one pressure sensor 36 and one flowmeter 38 are illustrated in FIG. 1, it is to be understood that one or more additional pressure sensor and/or one or more additional flowmeter can be provided at other key locations in the irrigation network 20 to provide further information on the performance of the irrigation process. For instance, a pressure sensor and/or a flowmeter can be provided on each one of the sub-pipelines of the irrigation network 20. In other implementations, either one of the pressure sensor and the flowmeter, or both, can be omitted.

Each one of the sub-pipelines 30, 32 can be provided with an irrigation valve 34 provided upstream of a given one of the irrigation zones 14, 16, the irrigation valve 34 being configured to be controlled to modulate the volume of wastewater supplied to the given one of the irrigation zones 14, 16. Each one of the sub-pipelines 30, 32 can also be provided with a flushing valve 40 located downstream of a given irrigation zone and that can be controlled to implement a flushing cycle in the given one of the irrigation zones 14, 16 to clean given portions of the irrigation network 20. In some implementations, a flushing cycle can involve simultaneously opening the irrigation valve 34 and the flushing valve 40 of a given irrigation zone to circulate wastewater, or water from another source, in the corresponding sub-pipeline 30, 32 and in a flushing pipeline 48. To maintain the hydraulic system clean, a flushing cycle can be automatically programed at a specified frequency. In some implementations, an irrigation event can be initiated when the irrigation valve 34 is in an open configuration while the flushing valve 40 is in a closed configuration.

The weather station 44 can include various types of weather monitoring instruments to monitor variables related to meteorological conditions. Examples of monitoring instruments include a temperature sensor, a humidity sensor, a rain gauge, a solar radiation probe and an anemometer. These weather monitoring instruments can be configured to measure and report outdoor temperature, relative humidity, solar radiation, rainfall intensity and volumes, and wind speed, respectively, which are meteorological conditions that can influence the transpiration of the vegetation of the vegetated land. In some implementations, the weather monitoring instruments can be configured to continuously monitor meteorological conditions.

In some implementations, the rain gauge can be a key element of the weather station, since it can provide information relative to the rainfall intensity. The rainfall intensity, which can be expressed for instance in mm/hr, can be a variable that is taken into consideration in a predetermined irrigation protocol, as the rainfall intensity can influence the maximum daily volume of wastewater applied to the irrigation zone, or irrigation volume threshold. For instance, in some implementations, more rain may mean that less wastewater can be applied to the irrigation, while less rain may mean that more wastewater can be applied to the irrigation zone.

The control station 26 includes a controller, which can be for instance a programmable logic controller (PLC). The controller can enable controlled irrigation of an irrigation zone of a vegetated land. In some implementations, the controller can enable controlled irrigation of a plurality of irrigation zones, with each irrigation zone being equipped to be irrigated independently from other irrigation zones.

In some implementations, the control station 26 may include a processor. Of note, the processor can be implemented as a single unit (i.e., a single processor) or as a plurality of interconnected processing sub-units (i.e., a plurality of processors). The processing unit can be embodied by a computer, a microprocessor, a microcontroller, a central processing unit, or by any other type of processing resource (or any combinations thereof) configured to operate collectively as a processing unit. The processor can be implemented in hardware, software, firmware, or any combination thereof, and be connected to the various components of the controlled irrigation system 10 via appropriate communication ports.

At least one component of the control station 26 (e.g., the controller or the processor) is in data communication with at least one of the pump 24, the pressure sensor 36, the flowmeter 38, other component(s), instrument(s) or device(s) of the pumping station 22 if any, the monitoring device 42 or the weather station 44. It should be noted that the expression "data communication" may refer to any type of direct connection and/or indirect connection. For example, the controller or the processor(s) of the control station 26 may be connected to the pump 24, the pressure sensor 36, the flowmeter 38, the monitoring device 42 and/or the weather station 44 through direct communication such as a wired connection or via a network allowing data communication between devices or components of a network capable of receiving and/or sending data, which may include, to name a few, publicly accessible networks of linked networks, possibly operated by various distinct parties, such as the Internet, private networks (PN), personal area networks (PAN), local area networks (LAN), wide area networks (WAN), cable networks, satellite networks, cellular telephone networks and the like, or any combinations thereof.

The controller is configured to collect data from the instruments of the pumping station 22, which in the scenario illustrated in FIG. 1 includes the flowmeter 38 and the pressure sensor 36, from the monitoring devices 42 distributed over the irrigation zones of the vegetated land, and/or from the weather monitoring instruments of the weather station 44. The controller is further configured to analyze the collected data against predetermined parameters of a predetermined irrigation protocol to determine whether an irrigation event can be initiated or not. For instance, the controller can collect data related to the volume of irrigated wastewater supplied to the irrigation zones per irrigation event, and can sum this data to obtain a total volume of wastewater applied per day, or per another unit of time, which is information that can then be used to determine whether an irrigation event can be initiated or not. The rainfall intensity in a period of time prior to initiation of an irrigation event is also a valuable information to determine whether an irrigation event can be initiated or not. In addition, in some implementations, the forecasted rainfall intensity, which can be determined according to a weather forecast, predicted for a given period of time prior to initiation of a desired irrigation event, can also be used to determine whether an irrigation event can be initiated or not. The soil moisture of the irrigation zone, which can be provided by the monitoring devices installed in the irrigation zone, can also be used to determine whether an irrigation event can be initiated or not, as will be discussed in detail below.

The controller (or processor) of the control station 26 is further configured to process different types of signals, such as the ones that can be generated or produced by the pumping station 22 (or components thereof, such as the pressure sensor 36 and/or the flowmeter 38), the weather station 44 (or instruments thereof) and/or the monitoring device 42. Examples of processing techniques that may be performed by the controller may include filtering the signals, performing different operations (e.g., additions, subtractions, ratio calculations, Fourier transforms, filtering, averaging, or any other mathematical functions, transformations and/or analyses) and/or analyzing the signals. In addition, the controller of the control station 26 may be configured to control the operation of the components of the controlled irrigation system 10.

Once the data has been analyzed by the controller, the controller can subsequently provide instructions to the pump 24, the irrigation valves 34 and the flushing valves 40, to control irrigation of the irrigation zones 14, 16. The controller is thus operatively connected to the pump 24, and the pump 24 can receive instructions from the controller to control its operation.

In some implementations, the controlled irrigation system 10 may include a memory, or may include or be connected to a database to store data collected from the instruments and/or other relevant data. The memory may be integrated to the controller of the control station 26 or may alternatively be in data communication with at least one component of the control station 26. The data collected by the instruments may be stored in a dataset including information such as measurements or statistics. Of note, the information stored in the dataset may be representative of a past irrigation status of the irrigation zone, an actual (or ongoing) irrigation status of the irrigation, a forecasted irrigation status of the irrigation zone and/or any other relevant indicators or parameters that may be useful to control the irrigation of wastewater onto the vegetated land. The dataset may be stored as a relational database and may have a database format commonly used in the art, such as Domino, SQL, SCSV, Office 365, or the like. The dataset may comprise textual information, numeral information, time information, date information, image information, and any combinations thereof.

In some implementations, the memory or the database may further store calibration data. The calibration data may be representative of control parameters of the components or instruments of the controlled irrigation system 10. The data collected by the instruments may be compared to the calibration data, and after the comparison, the collected data and the calibration data may be combined to determine the appropriate control parameters of at least one of the components or instruments of the controlled irrigation system 10. The combination of the collected data and the calibration data may include an estimation, an approximation, an interpolation or an extrapolation of the control parameters.

The controller can be further configured to send the data collected from the instruments toward the memory, and/or to send the data to a web platform or a cloud-based platform. Storing collected data related to the operation of a controlled irrigation system 10 as described herein can enable characterizing the effect of meteorological conditions and irrigation events on the performance of the controlled irrigation system 10.

The controlled irrigation system 10 may include a user interface configured to control the controlled irrigation system 10 through the control station 26. The user interface may be configured to select one of the components of the controlled irrigation system 10, receive data collected by the instruments or components of the controlled irrigation system 10 and/or send instructions to the instruments or components of the controlled irrigation system 10. The user interface may be in data communication with each component of the controlled irrigation system 10 through a corresponding communication channel.

In some implementations, the user interface may be a graphical user interface. As the user interface is operatively connected to at least one component of the controlled irrigation system 10, a user may interact with the controlled irrigation system 10 (or components thereof). The user interface may be displayed on a display or a screen. In some implementations, the graphical user interface may be part of a web-based application that may be accessed and displayed using a computing device connected to the Internet or any types of network.

The user interface may be configured to provide a visual representation of the controlled irrigation system 10, the control parameters of the components or instruments of the controlled irrigation system, the data collected by the components or instruments of the controlled irrigation system, and/or the calibration data. The visual representation may include other information relevant to control the irrigation of an irrigation zone with wastewater. It should be noted that, in some implementations, the visual representation may be provided in real-time or near real-time.

In some implementations, a plurality of functionalities and/or modulable parameters may be accessible through the user interface. The user interface may be configured to provide an indication of the state of the controlled irrigation system 10 through visual inspection of the user interface and to allow manual control of at least one component or instrument of the controlled irrigation system 10. For example, and without being limitative, the user interface may provide information on zone activity (e.g., idle, irrigating, flushing, soaking, soaking tension low and deactivated), the state of valves (i.e., on or off), the state of pumps (i.e., on or off), daily irrigated volume per zone, sensor live readings, flowmeter measurements (e.g., flow rate ($m^3/h$)) and irrigated volume per zone per day ($m^3$), pressure gauge measurements (e.g., pressure (PSI)), tipping bucket (e.g., rainfall (mm/h) and total rain (mm/d)) and tensiometers or soil moisture sensors measurements (e.g., tension (kPa)/moisture (%) and limit tension). In addition, the user interface may be configured to select an irrigation program or protocol and operate the controlled irrigation system 10 in a manual mode. In the manual mode, a user may activate and/or deactivate an irrigation zone, a valve and/or a pump by interacting with the user interface.

The control station 26 (or at least one component thereof, e.g., the controller or processor) may be part of a programmable computer. Alternatively, the control station 26 may be in data communication with such a programmable computer. A programmable computer generally includes at least a processor and a data storage system that may include volatile and non-volatile memory and/or storage elements. The programmable computer may be a programmable logic unit, a mainframe computer, server, a personal computer, a cloud-based platform, program or system, laptop, personal data assistance, cellular telephone, smartphone, wearable device, tablet device, virtual reality devices, smart display devices, set-top box, video game console, portable video game devices, or virtual reality device. At least one of the steps of the processes described herein can be implemented in a computer software or program executable by the programmable computer. Of note, computer software or programs may be implemented in a high-level procedural or object-oriented programming and/or scripting language to communicate with a computer system. The programs can alternatively be implemented in assembly or machine language, if desired. In these implementations, the language may be a compiled or interpreted language. The computer programs are generally stored on a storage media or a device readable by a general or special purpose programmable computer for configuring and operating the computer when the storage media or device is read by the computer to perform the processes (or step(s) thereof) described herein.

In some implementations, at least one component or module of the controlled irrigation system 10 can be provided as a plug-in. The expression "plug-in" as used herein refers to a software component adding a predetermined feature or functionality to the controlled irrigation system 10. Providing different components or modules as plug-ins can be associated with some benefits, such as, for example and without being limitative, adaptability, modularity and flexibility.

As mentioned above, at least one monitoring device is provided per irrigation zone for monitoring a property indicative of an irrigation status of the irrigation zone. In some implementations, the monitoring device can be a soil tensiometer. A soil tensiometer is configured to provide a measurement of soil water tension, or soil moisture tension, at the depth of installation. A soil tensiometer typically includes a porous cup and a glass or plastic tube that are initially filled with water, and a pressure gauge. The soil water tension is measured against a partial vacuum that is initially created when the soil tensiometer is first installed in an unsaturated soil. The soil tension, which can be expressed in pressure units such as kPa, is an indicator of the energy required by the plant to extract water from the soil. As water is pulled out of the soil by the vegetation and evaporation, the soil will absorb water from the ceramic cup and thus increase the vacuum inside the tube. The higher the suction, the more difficult it is for the plant to withdraw water from the soil. On the other hand, when the soil is near or above saturation, water can be suctioned in from the soil to the inside of the tube through the ceramic cup, thereby reducing the vacuum inside the tube.

The water content of any particular soil layer can decrease as a result of soil evaporation, root absorption, or due to water drainage to an adjacent layer. The soil tension at which a soil can hold water against gravity and below which there is drainage is referred to as the drained upper limit (DUL), which can also be referred to as field capacity. In other words, the DUL can be defined as representing the amount of water that remains in the soil and that is available to the vegetation for uptake, after excess water has drained away by gravitational drainage and the rate of change of water content in the soil remains relatively constant, indicating that drainage has become negligible. The DUL can thus be viewed as a water content, expressed in volume percentage, remaining in the soil after an irrigation event or a rainfall event, at a given depth and after a given period of time. As mentioned above, the DUL can also be expressed as a soil tension, for instance in kPa, at which it is determined that water is retained after gravitational flow. The difference between soil tension and the DUL can thus provide valuable information with respect to the available water reserve of a soil and its capacity to receive more water before witnessing gravitational flow, and in the context of the present description, to be subjected to an irrigation event.

The DUL can be dependent on soil characteristics, such as the soil texture, structure, and composition, for instance with respect to the presence of clay, sand, organic matter, etc., the temperature and evapotranspiration.

The DUL can be determined during a startup phase of the implementation of the controlled irrigation system, and be subsequently used as a DUL-related criterion in a predetermined irrigation protocol. Determining the DUL can involve analyzing measurements collected by the tensiometers installed in the irrigation zones following an irrigation event and/or a rainfall event, or a series of irrigation events and/or rainfall events. The determination of the DUL can thus be performed following the occurrence of a planned irrigation event, or after sufficient rainfall has been received to fill the soil down to a given depth, or a combination both.

In some implementations, the DUL can be determined by analysing the evolution of the water tension, given by tensiometers, following an irrigation or rainfall event that saturates the soil at a depth beyond the measuring point of the tensiometer. At saturation, the measured tension will be expected to be at its lowest (theoretical zero kPa) and, therefore, under the DUL. Once the irrigation or rainfall event has stopped, the tension will typically start to increase as the water is leaving the soil profile. When the tension is below the DUL, the water in the soil will drain by gravity which will be categorized by a steep water tension curve. The slope (derivative) of the curve will then gradually tend towards zero as the water in the soil is slower and slower to leave the soil. The DUL can be determined by a sudden decrease in the steepness of the curve in the span of a couple hours. This variation in the curve can show the moment when the last of the gravity flowing water leaves the soil profile. The tension corresponding to the water left in the soil at that point can be interpreted as corresponding to the DUL. Theoretically, when the matric potential of the soil reaches a value of about 0 kPa, there is no longer any suction in the soil, and the soil can thus be considered saturated. It is to be noted that, in the context of the present description, the expressions "soil tension", "soil water tension" and "matric potential" can be used interchangeably. In such a scenario, the pores of the soil can be considered filled with water and thus, there is no more presence of air in the pores of the soil. In some implementations, the soil can be considered saturated at values higher than 0 kPa, depending on factors such as the calibration and sensitivity of the tensiometers used to perform the measurements. For instance, in some implementations, the soil can be considered saturated when the soil tension reaches a value under 5 kPa.

Thus, in some implementations, determining the DUL can include obtaining a series of soil water tension measurements on the vegetated land during a startup phase, which can be performed during a series of characterized events such as a planned irrigation event or a rainfall event. Determining the DUL can also include characterizing a soil sample from the irrigation zone during the startup phase to obtain characteristics of the soil sample. Once the DUL is obtained for a given irrigation zone, this value can be used as a basis to establish a criterion, i.e., a DUL-related criterion, against which to compare soil water tension measurements obtained at a given time for a given irrigation zone to determine if an irrigation event can be initiated. In some implementations, the DUL-related criterion can be the DUL itself, or alternatively, the DUL-related criterion can be established based on the DUL, as will be described in more detail below.

In some implementations, the DUL can be assessed at given timepoints or according to predetermined time intervals once the implementation of the controlled irrigation system has been initiated. Assessing the DUL at given timepoints or according to predetermined time intervals can enable adjusting certain parameters of operation of the controlled irrigation system in response to variations in the measured DUL through time, or can contribute to validating that the DUL determined during the startup phase remains representation of the soil of the irrigation zone.

Soil water tension measurements indicative of the irrigation status of the irrigation zone can be obtained using the one or more soil tensiometers installed in the irrigation zone as the monitoring devices, and can be used to control the irrigation of an irrigation zone with wastewater. For instance, in some implementations, one to two soil tensiometers can be installed per irrigation zone for zone areas of one hectare or less. More than two soil tensiometers can be installed for larger irrigation zones, or when the irrigation zone includes heterogeneous regions. In implementations where more than one soil tensiometers is used in an irrigation zone, the measurements obtained by each of the soil tensiometers can be averaged, and the average can then be used to be evaluated against a given criterion. Ideally, soil tensiometers are installed under conditions that are representative of the entire irrigation zone to provide accurate information regarding the irrigation status of the irrigation zone. The depth of installation of a soil tensiometer can depend on the plant species used. Generally, the ceramic cup of the soil tensiometer can be installed in the last third of the plant root zone depth. When fast-growing shrub willow is chosen as the vegetation chosen for the vegetated land, the depth of installation of the ceramic cup of the soil tensiometers can be between about 20 cm to about 30 cm, for example.

A process for controlling irrigation of wastewater onto a vegetated land will now be described in further detail. The process can include determining a DUL-related criterion of an irrigation zone of the vegetated land. The irrigation zone can then be monitored to assess the moisture level of the soil, and more particularly by measuring a soil water tension for the irrigation zone, using one or more soil tensiometer. When a single soil tensiometer is installed in an irrigation zone, the soil water tension measurement can be used as is or through a function to remove noise if desired. When more than one soil tensiometer is installed in an irrigation zone, an average of the soil water tension measurements from the soil tensiometers can be calculated and used as a representative value of the soil water tension of the irrigation zone. The soil water tension measurement can then be evaluated against a DUL-related criterion that has previously been determined for that irrigation zone. The step of evaluating the soil water tension measurement against the DUL-related criterion of the irrigation zone can be performed automatically or manually.

When performed manually, the soil water tension measurement be evaluated against a DUL-related criterion that has previously been determined for that irrigation zone, and the operation of the pump can be adjusted in accordance with the extent of the departure from the DUL-related criterion.

When performed automatically, the soil water tension measurement can be transmitted to a controller as described above for analysis. As the controller is operatively to the pump via the VFD, the operation of the pump can be adjusted automatically in accordance with the extent of the departure from the DUL-related criterion.

In some implementations, the DUL can be used as a basis to establish a criterion against which a soil water tension measurement is evaluated and that can be used to determine whether an irrigation event can be initiated or not, i.e., to establish a DUL-related criterion.

For instance, the DUL-related criterion can be established based on the DUL to which is added a certain percentage of the difference between the DUL and the wilting point of the irrigation zone, and in turn, the DUL-related criterion can be used to determine whether an irrigation event can be initiated or not. In some implementations, the percentage of the difference between the DUL and the wilting point of the irrigation zone can be less than 30%, less than 20%, less than 15%, less than 10%, or less than 5%. It is to be noted that the wilting point can also be referred to as a lower limit of plant available water. For ease of reference, the percentage of the difference between the DUL and the wilting point can be referred to as x % plant available water (PAW), in which scenarios the DUL-related criterion can be expressed as DUL+x % PAW. For instance, for a DUL of 10 kPa and a wilting point of 30 kPa, and a DUL-related criterion of DUL+5% PAW, the DUL-related criterion would correspond to 11 kPa, as 5% of 20 kPa represents 1 kPa. In implementations where the DUL-related criterion is DUL+x % PAW, an irrigation event can be initiated for instance if the soil tension is equal to or above DUL+5% PAW, DUL+10% PAW, DUL+15% PAW, DUL+20% PAW, or DUL+30% PAW.

In another example, the DUL-related criterion can be obtained based on the impact of an irrigation event on the soil tension, the irrigation event being initiated when the soil tension is at or near the DUL. In order to measure the impact of the irrigation event on soil tension, a test irrigation event can be initiated when the soil tension is at a value close to or at the DUL, for instance when the DUL is between DUL and DUL+x kPa. The x kPa value can be for instance between 0.5 kPa and 5 kPa. In some implementations, the x kPa value can be about 1 kPa. The difference in soil tension before and after the test irrigation event, i.e., the soil tension loss, is then determined, and this value can be used to determine the DUL-related criterion for irrigation. In such implementations, the DUL-related criterion thus corresponds to the DUL to which is added the impact of the test irrigation event on the soil tension. For example, for an irrigation zone having a DUL of 10 kPa, if it is determined that after a test irrigation event initiated when the soil tension was at DUL+1 kPa, the average tension lost after the test irrigation event is 2 kPa, then the criterion could be determined as corresponding to 12 kPa+/−1 kPa. This DUL-related criterion can vary depending on the irrigation zone as topography and soil properties can vary for each irrigation zone, and on the hydraulic load applied with every event. In some implementations, the criterion can be between DUL+0.2 kPa and DUL+3 kPa, or between DUL+0.2 kPa and DUL+10 kPa, for example. When the DUL-related criterion is established in accordance with the technique described above, the value of this criterion can be referred to as "DUL+1 irrigation event" in the present document. The DUL-related criterion can be increased by a safety buffer when the data is new or questionable. For instance, the criterion can be increased by up to 20%. In some implementations, the DUL-related criterion can be adjusted, either manually or automatically, if it is observed that an irrigation event results in the soil tension dropping under the DUL.

In some implementations, when the DUL-related criterion used is "DUL+1 irrigation event", the "DUL+1 irrigation event" can be used as a first DUL-related criterion, and a second DUL-related criterion can be used to determine whether an irrigation event characterized by an increased irrigation volume and/or increased irrigation event duration can be initiated. The second DUL-related criterion can be referred to as "DUL+x irrigation event", with x corresponding to a number of irrigation events and being greater than 1. Of note, x can be an integer number or a number with a fractional component. For instance, when x=2, the DUL-related criterion would correspond to "DUL+2 irrigation events", meaning that the DUL-related criterion corresponds to a soil tension indicating that an irrigation event that is greater (due to an increased volume and/or increased duration) by a factor 2 can be initiated, compared to when an irrigation event that would be initiated following the determination that the soil tension is equal or above the criterion "DUL+1 irrigation event" while not reaching the "DUL+2 irrigation events" criterion. The use of the second DUL-related criterion can be desirable to determine when it can be advisable to proceed with a greater irrigation event when this second DUL-related criterion is met. In such implementations, a single and "normal" irrigation event can be initiated if the soil tension measurement is equal or above the first DUL-related criterion "DUL+1 irrigation event" and below the second DUL-related criterion "DUL+x irrigation event". On the other hand, if it is determined that the soil tension measurement is equal or above the second DUL-related criterion "DUL+x irrigation event", a greater irrigation event by a factor x can be initiated. In an example scenario, the irrigation volume of an irrigation event can be about 100 $m^3$, and the "DUL+1 irrigation event" criterion can be 25 kPa, for a DUL of 20 kPa. If experiments that were previously conducted determined that the soil tension threshold to irrigate 300 $m^3$ was 40 kPa, for instance without risking deep percolation or runoff, this would mean that the "DUL+3 irrigation event" in that scenario would be 40 kPa. In some implementations, the use of both "DUL+1 irrigation event" and "DUL+x irrigation event" as criteria to determine whether an irrigation even can be initiated and the increased magnitude of this irrigation event can contribute to reducing the effect of gravitational flow in pipelines on the heterogeneity of irrigation in irregular fields, since the longer the irrigation event, the smaller the effect of post-irrigation gravitational flow may be on the uniformity of the distribution of the irrigated wastewater.

In some implementations, it may be desirable to maintain the soil tension of a given irrigation zone within a certain range to contribute to maximize, or enhance, the volume of wastewater applied to the irrigation zone over time. For instance, when the DUL-related criterion is distinct from the DUL itself, the range can be defined between the DUL and the DUL-related criterion. In some implementations, the range within which to maintain the soil tension can thus correspond to the DUL and DUL+x % PAW. In other implementations, the range within which to maintain the soil tension can correspond to the DUL and DUL+1 irrigation event, or the DUL and DUL+x irrigation event.

Basing the decision to initiate an irrigation event at least in part on the soil water tension evaluated against a DUL-related criterion of the irrigation zone can enable the plants and soil to be constantly supplied with a volume of wastewater that they can manage, which can contribute to maximizing, or enhancing, the volume of wastewater applied to the irrigation zone over time. Furthermore, basing the decision to initiate an irrigation event at least in part on the soil water tension evaluated against the DUL-related criterion of the irrigation zone also takes advantage of the soil characteristics and evapotranspiration profile of the vegetation to use the ability of the soil and vegetation to receive and treat the wastewater closest to their full potential. With this approach, an objective is to provide a volume wastewater to the irrigation zone per unit of time that is as high as possible to treat large volumes of wastewater, while ensuring that the volume of irrigated wastewater is not so large that untreated wastewater percolates past a certain depth or that the irrigation zone gets flooded.

Thus, providing a controlled irrigation of an irrigation zone so as to maintain the soil water tension close to the DUL, such as within one irrigation event of the DUL, within DUL+1 irrigation event, can contribute to maximize the amount of water in the field while minimizing drainage out of the root zone of plants, which in turn can contribute to enhance consumption and evapotranspiration by plants. In addition to enhancing transpiration, maintaining the soil water tension close to the DUL, such as within one irrigation event of the DUL, i.e., within DUL+1 irrigation event, can facilitate maintaining a favorable environment in the root zone to the degradation or the transformation of contaminants that can be present in wastewater, such as the degradation of organic matter, nitrification of ammoniacal nitrogen, etc. By maintaining a tension equal or above the DUL, the gravitational flow, i.e., gravitation drainage, beyond the plants root zone can be avoided, such that substantially all of the irrigated wastewater can remain available to be consumed and transpired by plants.

This strategy contrasts with conventional irrigation approaches used in agriculture. Conventional irrigation approaches used in agriculture are typically aimed at maximizing yield by minimizing the amount of water irrigated in the field in order to conserve water resources. Water is thus supplied minimally, i.e., in the least amount, to agricultural crops to maintain the soil tension below the wilting point, which corresponds to the amount of water in the soil that is held so tightly by the soil matrix that the roots cannot withdrawn and absorb this water, before water stress adversely impacts the plant while ensuring that yield is not compromised. Conventional irrigation typically starts only when the crops are near their wilting point (hydraulic stress point). The mindset for such conventional approaches is to irrigate only if needed, and the volume of water applied per irrigation event corresponds to the volume needed to reach the DUL.

Another benefit of using a soil tensiometers to measure the soil water tension in the soil of the irrigation zone is that such soil water tension measurements are not impacted by the salt content of water present in the pores of the soil. Given that wastewater can have a high salt content or a variable salt content, the use of soil water tension measurements to provide information of the irrigation status of an irrigation zone independently of the salt content of the wastewater can thus enable to have access to more accurate and reliable data compared to "dielectric type" soil moisture probes typically used in agriculture applications.

In some implementations, soil water tension measurements can be taken for each one of the irrigation zones, and the controlled irrigation process can include determining the irrigation zone with the largest departure, or largest differential, above the corresponding DUL-related criterion. Once the irrigation zone having the largest differential of the soil water tension measurement above the DUL-related criterion is determined, the controller can be configured to send instructions to the pump to initiate an irrigation event for that given irrigation zone. Depending on the configuration of the irrigation network, an irrigation event can be initiated for more than one irrigation zone at a time, or simultaneously, for instance for the irrigation zones having the largest differential the corresponding soil water tension measurement and the corresponding DUL-related criterion. Alternatively, the irrigation network can be configured to irrigate irrigation zones sequentially, starting by irrigating a first irrigation zone having the largest differential between the corresponding soil water tension measurement and the corresponding DUL-related criterion, followed by irrigating a second irrigation zone having the second largest differential between the corresponding soil water tension measurement and the corresponding DUL-related criterion, and so on.

Controlled Application of Wastewater to an Irrigation Zone of a Vegetated Land by Implementation of a Predetermined Irrigation Protocol With reference now to FIGS. 2-6, various implementations of a predetermined irrigation protocol for controlling the application of wastewater to an irrigation will now be described.

In general terms, a main objective of the irrigation protocol is to apply a high daily hydraulic loading to each irrigation zone. The expression "hydraulic loading" refers to the volume of wastewater applied to an irrigation zone per time period, with a daily hydraulic loading representing the total volume of wastewater applied per day.

It is to be noted that the expression "irrigation protocol" can be used interchangeably with the expressions "control loop" and "irrigation feedback loop", as the irrigation protocol involves the generation of data by the weather station, the weather monitoring device(s), and/or the monitoring devices installed in the irrigation zones, and additional monitoring devices such as hydraulic monitoring devices including for instance a flowmeter, a pressure gauge, a real time clock etc., with the controller collecting such data, analyzing it, and generating output data that can be used as instructions for operating components of the irrigation network, such as the pump, the irrigation valves and the flushing valves.

The irrigation protocol can be established using various parameters that relate to the physicochemical characteristic of the wastewater that is to be applied to the irrigation zones, i.e., the wastewater characterization profile, the soil characterization profiles of the irrigation zones, including the soil water tension of the irrigation zones. The term "parameter", when referring to an irrigation protocol as described herein, can be used interchangeably with the terms condition or criterion.

Figure 2:
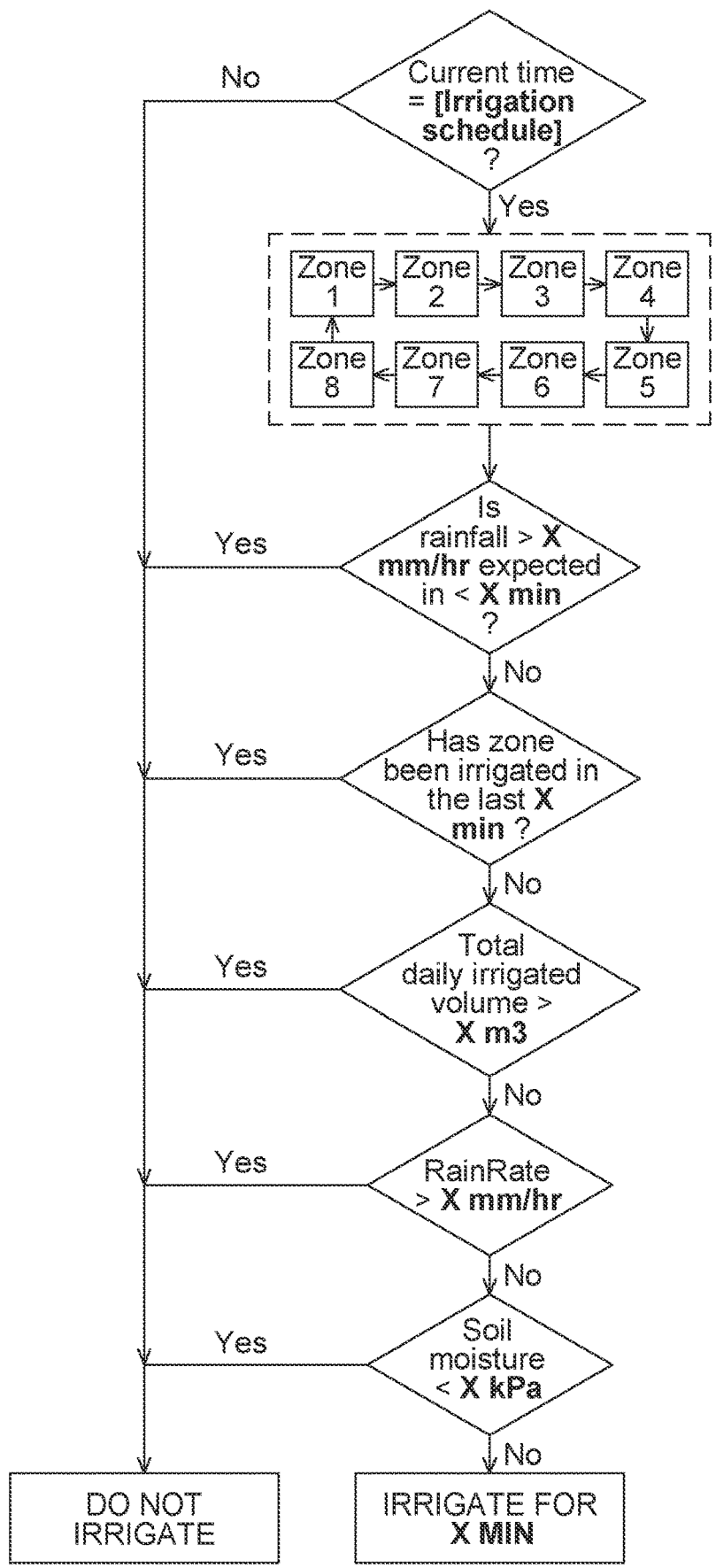
FIG. 2 is a schematic representation of an irrigation protocol that includes seven parameters, namely an irrigation schedule, a forecasted rainfall intensity, a soaking time, an irrigation volume threshold, a rainfall intensity, a soil moisture, and an irrigation event duration.

FIG. 2 illustrates an example of an irrigation protocol that includes seven parameters that can influence whether an irrigation event having a start irrigation time and an end irrigation time can be initiated. These seven parameters are:
  an irrigation schedule corresponding to a time period during which irrigation is determined to be indicated;
  a forecasted rainfall intensity;
  a soaking time;
  an irrigation volume threshold or maximum daily irrigation volume;
  a rainfall intensity prior to the irrigation event;
  a soil moisture; and
  an irrigation event duration.

Each of these parameters will be described in the following paragraphs. It is to be noted that a given irrigation protocol generally includes at least the irrigation schedule and the irrigation duration as parameters, and a selection of at least one of the prior irrigation time, the total daily irrigated volume, the forecasted rainfall intensity, the rainfall intensity, and the soil moisture. It should thus be understood that when using the expression "if all other criteria of the irrigation protocol are met" in the below paragraphs, the number of parameters or criteria can vary according to the chosen protocol.

Irrigation Schedule

The irrigation schedule corresponds to an interval of time during a 24-hour period during which it has been previously established that initiating an irrigation event is suitable. The irrigation schedule has a start time and an end time. In some implementations, the irrigation schedule can correspond to the photoperiod at the given time in the year. The photoperiod can be defined as the period of time during the day between the sunrise and the sunset, and thus can vary over the course of the year. Performing an irrigation event during the photoperiod can promote evaporation on soil and plants surfaces via exposition to solar radiation. This practice of maximizing water loss is typically contrary to the good practice of conventional agricultural irrigation where one seeks to minimize water loss. The range of hours where irrigation can be initiated, i.e., the irrigation schedule, can be automatically adjusted throughout the year, or the period of the year when irrigation is possible depending on the climate, with the data from the solar radiation sensor of the weather station to take into account variations in the photoperiod. The irrigation schedule can also be adjusted to start a given number of minutes before the sunrise, and/or to end a given number of minutes after the sunset. In other implementations, the irrigation schedule can be manually adjusted according to other factors such as the availability of wastewater to be treated.

As an example, an irrigation schedule in June in the Northern Hemisphere, can be between 6 h00 and 20 h00. Thus, no irrigation event would be initiated if the time of day is outside that range of time, whereas if the time of day falls within that range, an irrigation event can be initiated, if all other criteria of the irrigation protocol are met.

Forecasted Rainfall Intensity

The forecasted rainfall intensity is defined as the amount of rain expected to fall during a given period of time, the given period of time occurring before a given timepoint. The forecasted rainfall intensity can be expressed in depth units per unit of time, such as mm per hour (mm/h), and the given timepoint can be expressed in unit of time, such as in minutes (min).

Including the forecasted rainfall intensity in the irrigation protocol can facilitate avoiding risks of wastewater runoff and percolation beyond the plant root zone by anticipating events that could lead to such risks.

In some implementations, no irrigation event is initiated if it is expected to rain with an intensity greater than x mm/h in less than a given number of minutes, whereas an irrigation event can be initiated if the forecasted rainfall intensity is expected to be equal to x (or be below x if x does not correspond to zero) for the next given number of minutes.

For example, x can correspond to zero, such that no irrigation event is initiated if it is expected to rain with an intensity greater than zero mm/h in less than a given number of minutes, whereas an irrigation event can be initiated if the forecasted rainfall intensity is expected to be zero for the next given number of minutes.

In some implementations, the criteria associated with the forecasted rainfall intensity can be adjusted to values greater than zero mm/h depending on the characteristics of the wastewater effluent, and/or the environmental risks associated with a potential runoff and percolation of the wastewater effluent. For instance, for wastewater effluents that are considered less contaminated, it may be acceptable to allow the forecasted rainfall intensity to be greater than zero. Thus, in some implementations, the forecasted rainfall intensity above which no irrigation event is initiated can range for instance between about 0.2 mm/h to about 10 mm/h, at anytime in a number of minutes that can range between 15 and 90 minutes. It is to be understood that these values are given for exemplary purposes only and should not be considered limitative.

Soaking Time

The soaking time corresponds to the time elapsed between two successive irrigation events in the same irrigation zone, i.e., the delay between two irrigation events in a same irrigation zone. The soaking time can be determined according to a period of time that is sufficient for the wastewater supplied to the irrigation zone to percolate through the soil matrix and reach the monitoring device measuring soil properties, such as soil tensiometers, so as to enable the monitoring device to analyze the soil conditions before a subsequent irrigation event is initiated. The soaking time is dependent on soil characteristics, and can be determined on site during a startup phase of the implementation of the controlled irrigation system. In some implementations, soil tensiometers can be used to determine the soaking time of an irrigation zone, to evaluate the progression through time of the soil water tension following a planned irrigation event and/or a rainfall event. In some implementations, the soaking time could be reassessed in an automated fashion during system operation, for example by considering the time it takes for a tensiometer reading of a soil with a given matric potential to respond to a given irrigation event.

As an example, in some implementations, the soaking time can range from between about 2 minutes to about 30 minutes. For example, if a soaking time is set at 5 minutes, and the prior irrigation event finished at 13 h05, i.e., the prior irrigation time is 13 h05, a subsequent irrigation event would not be initiated before 13 h10, if all other criteria of the irrigation protocol are met.

Irrigation Volume Threshold or Maximum Daily Irrigation Volume

The irrigation threshold, or maximum daily irrigation volume per irrigation zone, refers to a predetermined cumulative volume of wastewater that has been determined to be suitable to apply to an irrigation zone per a given period of time, such as per day.

The maximum daily irrigation volume can be determined in accordance with the wastewater characterization profile, and thus can vary depending on the concentration of contaminants in the wastewater. The determination of maximum daily irrigation volume in accordance with wastewater characterization profile can enable ensuring that the contaminant load applied to the irrigation zone does not exceed the capacity of the soil, the microorganisms and the vegetation to receive such wastewater, and degrade, transform, adsorb or absorb the contaminants. The maximum daily irrigation volume can thus depend on the nature of the wastewater to be treated, and can vary over time. Furthermore, the maximum daily irrigation volume can also depend on the soil characterization profile, and on the characteristics of the vegetation of the vegetated land, such as the vegetation transpiration.

When using the term "maximum" or "maximizing" in the context of the present description, it is to be understood that it is intended to refer to a volume that tends toward what has been previously determined to correspond to a theoretical volume or empirical volume of wastewater that is suitable to supply to a given irrigation zone during a given period of time, and can include variations to such volumes of wastewater that are up to 10% of the previously determined theoretical volume or empirical volume.

It is also to be noted that the expression "maximum daily irrigation volume" can be used interchangeably with the expressions "cumulative daily irrigation volume threshold", "daily irrigation volume threshold", and "irrigation volume threshold".

In some implementations, when the wastewater effluent is loaded with organic matter and/or ammoniacal nitrogen, determining the wastewater characterization profile can include carrying out an oxygen balance during a startup phase of the implementation of the controlled irrigation system to compare the daily biological oxygen demand loading associated to the irrigation to the daily soil passive oxygenation capacity.

In some implementations, when the wastewater effluent is loaded with metals or nutrients, determining the wastewater characterization profile can include analyzing the contaminant loading of the wastewater, and the maximum daily irrigation volume can be determined by comparing the contaminant loading applied to an irrigation zone with the quantity of contaminants that can be absorbed by the vegetation. Taking into consideration the contaminant loading of the wastewater contributes to maintain treatment efficiency and process durability, for instance by reducing the risk of soil clogging due a contaminant overload, which are benefits over conventional irrigation systems.

Once the maximum daily irrigation volume per irrigation zone is reached, a subsequent irrigation event would not be initiated. An irrigation event can be initiated if the maximum daily irrigation volume per irrigation zone is not met, and if all other criteria of the irrigation protocol are met.

Rainfall Intensity

The rainfall intensity is defined as the ratio of the total amount of rain falling during a given period to the duration of the period. The rainfall intensity can be expressed in depth units per unit time, such as mm per hour (mm/h).

Including the rainfall intensity in the irrigation protocol can facilitate avoiding risks of wastewater runoff and percolation beyond the plant root zone.

In some implementations, no irrigation event is initiated when the rainfall intensity is greater than zero mm/h, and an irrigation event can be initiated when the rainfall intensity is equal to zero mm/h.

In some implementations, the criterion associated with the rainfall intensity can be adjusted to a value greater than zero depending on the nature of the wastewater effluent and the wastewater characterization profile, and/or on the environmental risks associated with a potential runoff and percolation of the wastewater. For instance, in some implementations, the rainfall intensity above which no irrigation event is initiated can range between about 0.2 mm/h to about 2 mm/h, or between about 0.2 mm/h to about 10 mm/h.

In some implementations, the controller can be configured to take into account the rainfall weather forecast, and the irrigation protocol can be adapted such that no irrigation event is initiated if it is supposed to rain in the next given number of minutes, whereas an irrigation event can be initiated if no rain is expected for the next given number of minutes.

Soil Moisture

The soil moisture refers to the water stored in the soil, and can be affected by the characteristics of the soil and the rainfall events, and can be monitored using monitoring devices distributed over the irrigation zones.

In some implementations and as mentioned above, the monitoring device can include a soil tensiometer to measure soil water tension. Using soil water tension can be advantageous to evaluate soil moisture independently of the salinity of the wastewater used for irrigating the irrigation zone.

The soil moisture allows the system to irrigate when the soil is ready to receive more wastewater, which decreases the risks of wastewater drainage and runoff.

When the soil moisture is evaluated using one or more soil tensiometers to obtain soil water tension measurements, the soil water tension measurements collected for a given irrigation zone can be analyzed against at least one DUL-related criterion, which can be the DUL itself, or a criterion based on the DUL, for that given irrigation zone. The criterion related to the DUL can be a parameter that is set manually following the determination of the DUL during the startup phase. The criterion related to the DUL can also be reassessed after the implementation of the controlled irrigation system is initiated.

In some implementations and as described above, the criteria related to the DUL, i.e., the DUL-related criterion, can correspond to the DUL to which is added a certain value, which can correspond for instance to less than 30% of the difference between the DUL and the wilting point, or less than 20%, less than 15%, less than 10%, or less than 5% of the difference between the DUL and the wilting point. As mentioned above, the percentage of the difference between the DUL and the wilting point can thus be referred to as x % plant available water (PAW), with the DUL-related criterion being expressed as DUL+x % PAW. In such implementations, irrigation can be initiated when the soil water tension measurement is equal or above the DUL+x % PAW, and if all other criteria of the irrigation protocol are met.

In other implementations, the criterion related to the DUL, i.e., the DUL-related criterion, can correspond to DUL+1 irrigation event. In such implementations, irrigation can be initiated when the soil water tension measurement is equal or above the DUL+1 irrigation event, and if all other criteria of the irrigation protocol are met.

When the soil water tension measurements are analyzed against two DUL-related criteria, the first DUL-related criterion can correspond to DUL+1 irrigation event, and the second DUL-related criterion can correspond to DUL+x irrigation event, with x being greater than 1. In such implementations, an irrigation event can be initiated when the soil water tension measurement is equal or above the DUL+1 irrigation event and below DUL+x irrigation event, and if all other criteria of the irrigation protocol are met. For such irrigation event, the volume of wastewater applied or the duration of the irrigation event can correspond to the one associated with the DUL+1 irrigation event. Furthermore, if the soil water tension measurement is equal or above the DUL+x irrigation event, thus being necessarily above the DUL+1 irrigation event, then the magnitude of the irrigation event can be as determined by the value of x, x being above 1 and corresponding to a multiplier of the irrigation volume or irrigation duration of the irrigation event associated with the DUL+1 irrigation event. In some implementations, the DUL+x irrigation event can be used as a standalone criterion.

In some implementations, the controlled irrigation system 10 may include a prediction module in data communication with the control station 26 and the weather station 44. The prediction module can be configured to "learn" or "predict" which weather and field conditions lead to given changes in the soil water tension measured in the irrigation zone. By having a better overview of the impact of certain weather conditions on the soil water tension, at least one of the moment of irrigation event, the irrigation run time, the DUL+1 irrigation event, or the irrigation volume threshold can also be adapted, to maintain the soil water tension within a certain range relative to the DUL.

The prediction module may be configured to output an estimate of the soil water tension, or a projected soil water tension, based on information representative of the weather conditions. More specifically, the prediction module can receive at least one of the weather conditions and the actual soil tension as an input(s) and provide an estimated value of the impact of an irrigation event on the soil water tension as an output. The estimation of the soil water tension may also be based on a priori knowledge, computation, empirical data, theoretical model, calibration data and any combinations thereof. The estimated soil water tension may be representative of an instantaneous (i.e., actual) soil water tension and may be saved or stored on the memory or in the database. It should be noted that the instantaneous estimated water tension value may be temporarily or permanently saved. Subsequent water tension values may then be determined or evaluated, based on the collection or accumulation of the plurality of successive instantaneous estimated water tension values.

In some implementations, the prediction module may be configured to receive code, computer-readable instructions or any other computer programming steps or sub-steps as inputs and, in response thereto, send instructions or requests to the control station 26. These instructions or requests may be used to alter, modify and/or adjust the irrigation of the irrigation zone. Of note, these requests may be manually provided, automatically provided or semi-automatically provided.

Irrigation Duration

The irrigation duration corresponds to the duration of an irrigation event. The value of this parameter can depend on several factors, such as the irrigation rate, the availability of the wastewater effluent, the hydraulic configuration of the irrigation network, and the soil characterization profile.

The irrigation duration can be balanced between a duration that is too short, which may not be efficient from a hydraulic point of view and for the uniformity of the irrigation event, and a duration that is too long, which may lead to a risk of overshooting the irrigation.

In the context of the controlled irrigation system as described herein, the irrigation hydraulic loading per irrigation event used in the irrigation protocol can be considered as being substantially smaller compared to values of irrigation hydraulic loading for typical agricultural operations. It has been found that short but frequent irrigation events can facilitate a precise control of the soil water tension. With this atypical duration and hydraulic loading of irrigation events, the controlled irrigation system can maintain the soil water tension close to the DUL, which can be considered as an optimal tension for wastewater treatment, without exceeding it, i.e., without saturating the soil and loosing water to gravity. For example, in some implementations, the irrigation duration can be between 5 minutes and 30 minutes, the hydraulic rate can be between about 1 mm and about 5 mm per event and is repeated between 0 and 30 times over the period of 24 hours. This type of irrigation schedule can enable applying a volume of wastewater per irrigation event that contributes to maintaining the soil water tension close to the DUL, or above the DUL such as for instance at DUL+x % PAW (with x % being less than 30%) or at DUL+1 irrigation event, or within an interval defined by DUL and DUL+x % PAW (with x % being less than 30%), or DUL and DUL+1 irrigation event, which in turn can contribute to maximize the amount of the wastewater applied to the vegetated land over time.

In contrast, conventional irrigation typically starts only when the soil moisture reaches a percentage of the total available water capacity, or plant available water, that is typically above 50% from the DUL. The principle is to irrigate only if plants become in need of water. In such conventional irrigation processes, the volume of water applied per irrigation event typically corresponds to the volume needed to reach the DUL from a percentage of the total available water capacity that is typically above 50% from the DUL, such that typical hydraulic rate in conventional agricultural applications can be between 10 mm and 50 mm per event and irrigation occurs only every couple of days.

In some implementations, the duration of the irrigation event can be determined at least in part so as to maintain the soil tension close to the DUL, or above the DUL such as for instance at DUL+x % PAW (with x % being less than 30%) or at DUL+1 irrigation event, or within the interval defined by DUL and DUL+x % PAW (with x % being less than 30%), or DUL and DUL+1 irrigation event.

Examples of Irrigation Protocol Implementations and Associated Control Loop

Referring now to FIG. 2, in some implementations, the irrigation protocol can include the seven of the parameters described above. In such implementations, the controller can be configured to maintain the operation of the pump and associated irrigation network in standby, such that no irrigation event is initiated, when at least one of:
  the start irrigation time is outside of the irrigation schedule, which can be interpreted as meaning that the time of the day evaluated to determine if an irrigation event can be initiated is outside of the irrigation schedule;
  the forecasted rainfall intensity is predicted to be above a forecasted rainfall intensity threshold in less than a given number of minutes;
  the prior irrigation time is less than a given number of minutes, which can be interpreted as meaning that the number of minutes following the end of the prior irrigation event is less than a predetermined delay between two successive irrigation events corresponding to the soaking time;
  the total daily irrigated volume is equal or above an irrigation volume threshold, which can be interpreted as meaning that the total volume of wastewater that has been applied to the irrigation zone to date, starting at the beginning of the irrigation schedule, has reached the irrigation volume threshold volume of wastewater per day that the irrigation zone can receive;
  the rainfall intensity at the start irrigation time is above a rainfall intensity threshold, with the rainfall intensity threshold being set at either zero or above zero; and
  the soil water tension of the irrigation zone is below a DUL-related criterion.

Still referring to the implementation shown in FIG. 2, the controller can be further configured to operate the pump and associated irrigation network to initiate an irrigation event having a given irrigation duration, when the following criteria are met:
  the start irrigation time is within the irrigation schedule, which can be interpreted as meaning that the time of the day evaluated to determine if an irrigation event can be initiated is within the irrigation schedule;
  the forecasted rainfall intensity is anticipated to be equal or below the forecasted rainfall intensity threshold for a given number of minutes, or the forecasted rainfall intensity is anticipated to be higher than the forecasted rainfall intensity threshold but after the given number of minutes;
  the prior irrigation time is equal to or more than a given number of minutes, which can be interpreted as meaning that the number of minutes following the end of the prior irrigation event is equal or more than the soaking time;
  the total daily irrigated volume is below irrigation volume threshold, which can be interpreted as meaning that the total volume of wastewater that has been applied to the irrigation zone to date, starting at the beginning of the irrigation schedule, has not reached the irrigation volume threshold of wastewater per day that the irrigation zone can receive;
  the rainfall intensity at the start irrigation time is equal to or below the rainfall intensity threshold; and
  the soil water tension of the irrigation zone is equal or above a DUL-related criterion.

Figure 3:
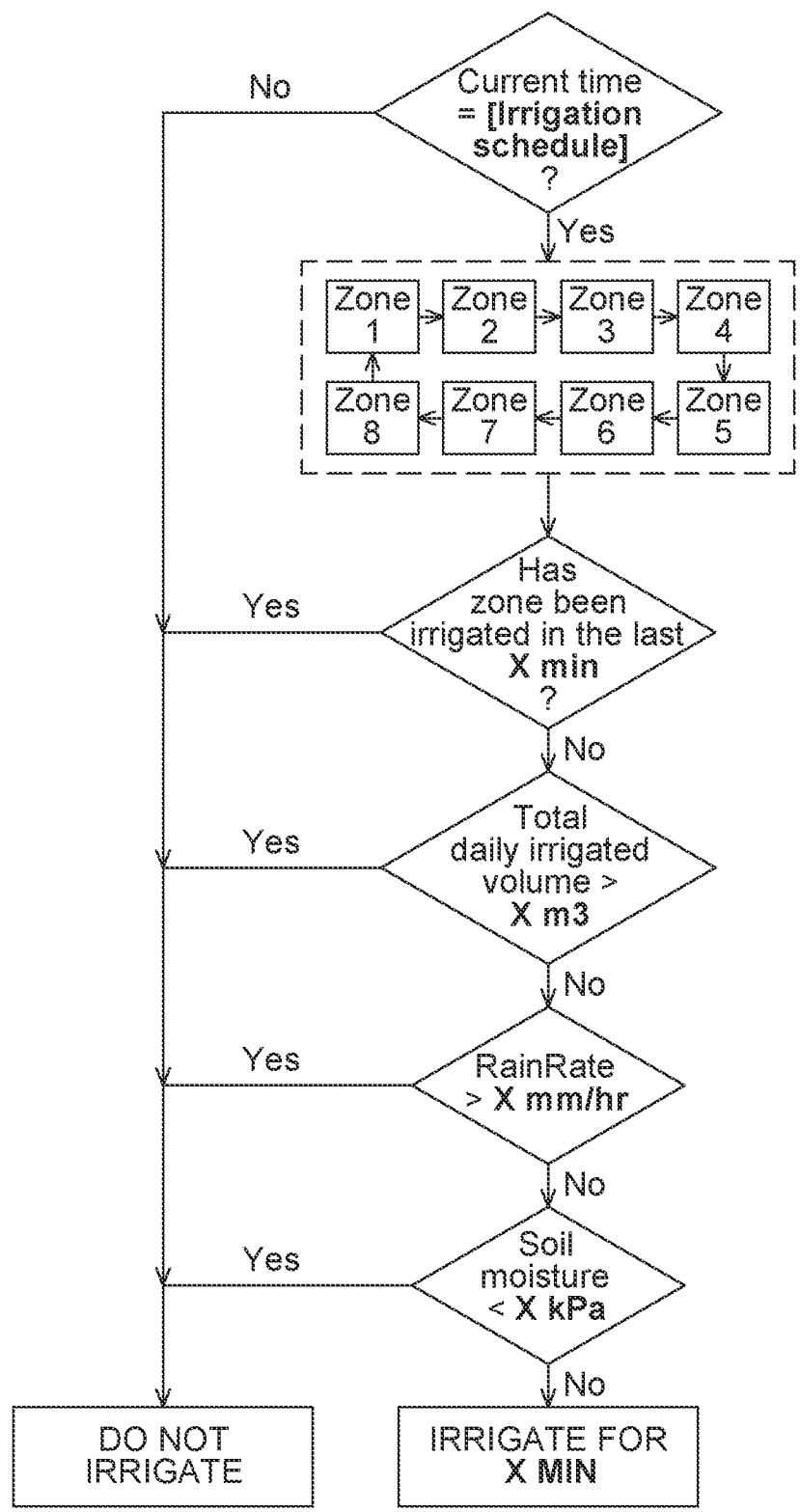
FIG. 3 is a schematic representation of an irrigation protocol that includes six selected parameters.

Referring to FIG. 3, in some implementations, the irrigation protocol can include six of the parameters described above. In such implementations, the controller can be configured to maintain the operation of the pump and associated irrigation network in standby, such that no irrigation event is initiated, when at least one of:
  the start irrigation time is outside of the irrigation schedule, which can be interpreted as meaning that the time of the day evaluated to determine if an irrigation event can be initiated is outside of the irrigation schedule;
  the prior irrigation time is less than a given number of minutes, which can be interpreted as meaning that the number of minutes following the end of the prior irrigation event is less than a predetermined delay between two successive irrigation events corresponding to the soaking time;
  the total daily irrigated volume is equal or above an irrigation volume threshold, which can be interpreted as meaning that the total volume of wastewater that has been applied to the irrigation zone to date, starting at the beginning of the irrigation schedule, has reached the irrigation volume threshold volume of wastewater per day that the irrigation zone can receive;
  the rainfall intensity at the start irrigation time is above a rainfall intensity threshold, with the rainfall intensity threshold being set at either zero or above zero; and
  the soil water tension of the irrigation zone is below a DUL-related criterion.

Still referring to the implementation shown in FIG. 3, the controller can be further configured to operate the pump and associated irrigation network to initiate an irrigation event having a given irrigation duration, when the following criteria are met:
- the start irrigation time is within the irrigation schedule, which can be interpreted as meaning that the time of the day evaluated to determine if an irrigation event can be initiated is within the irrigation schedule;
- the prior irrigation time is equal to or more than a given number of minutes, which can be interpreted as meaning that the number of minutes following the end of the prior irrigation event is equal or more than the soaking time;
- the total daily irrigated volume is below irrigation volume threshold, which can be interpreted as meaning that the total volume of wastewater that has been applied to the irrigation zone to date, starting at the beginning of the irrigation schedule, has not reached the irrigation volume threshold of wastewater per day that the irrigation zone can receive;
- the rainfall intensity at the start irrigation time is equal to or below the rainfall intensity threshold; and
- the soil water tension of the irrigation zone is equal or above a DUL-related criterion.

Figure 4:
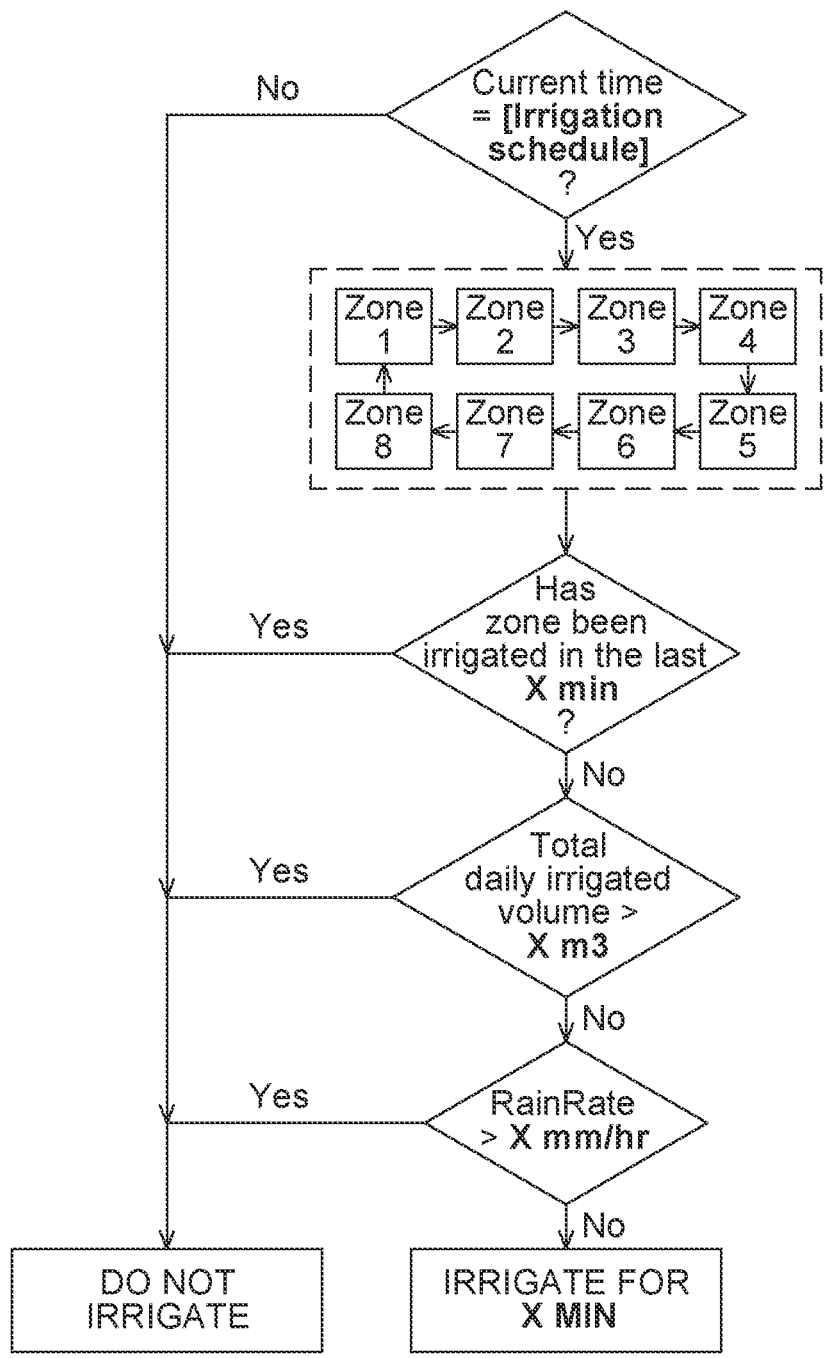
FIG. 4 is a schematic representation of an irrigation protocol that includes five selected parameters.

Referring to FIG. 4, in some implementations, the irrigation protocol can include a selection of parameters among the prior irrigation time, the total daily irrigated volume, the rainfall intensity, the forecasted rainfall intensity, and the soil moisture. In the implementation shown in FIG. 4, the selected parameters include the prior irrigation time, the total daily irrigated volume and the rainfall intensity. In such implementations, the controller can be configured to maintain the operation of the pump and associated irrigation network in standby, such that no irrigation event is initiated, when at least one of:
- the start irrigation time is outside of the irrigation schedule;
- the total daily irrigated volume is equal or above an irrigation volume threshold;
- the prior irrigation time is less than a given number of minutes, which can be interpreted as meaning that the number of minutes following the end of the prior irrigation event is less than a predetermined delay between two successive irrigation events corresponding to the soaking time; and
- the rainfall intensity at the start irrigation time is above a rainfall intensity threshold, with the rainfall intensity threshold being set at either zero or above zero.

Still referring to the implementation shown in FIG. 4, the controller can be further configured to operate the pump and associated irrigation network to initiate an irrigation event having a given irrigation duration, when the following criteria are met:
- the start irrigation time is within the irrigation schedule;
- the prior irrigation time is equal to or more than a given number of minutes, which can be interpreted as meaning that the number of minutes following the end of the prior irrigation event is equal or more than the soaking time;
- the total daily irrigated volume is below the irrigation volume threshold; and
- the rainfall intensity at the start irrigation time is equal to or below the rainfall intensity threshold.

In the scenario presented in FIG. 4, no irrigation event is thus initiated if the irrigation start time is outside the irrigation schedule, the rainfall intensity at the start irrigation time is above a rainfall intensity threshold, or if the irrigation volume threshold has been reached, and an irrigation event can be initiated if the start irrigation time is within the irrigation schedule and the irrigation volume threshold has not been reached, as long as there is no rainfall or the rainfall intensity is equal to or below a certain threshold.

Figure 5:
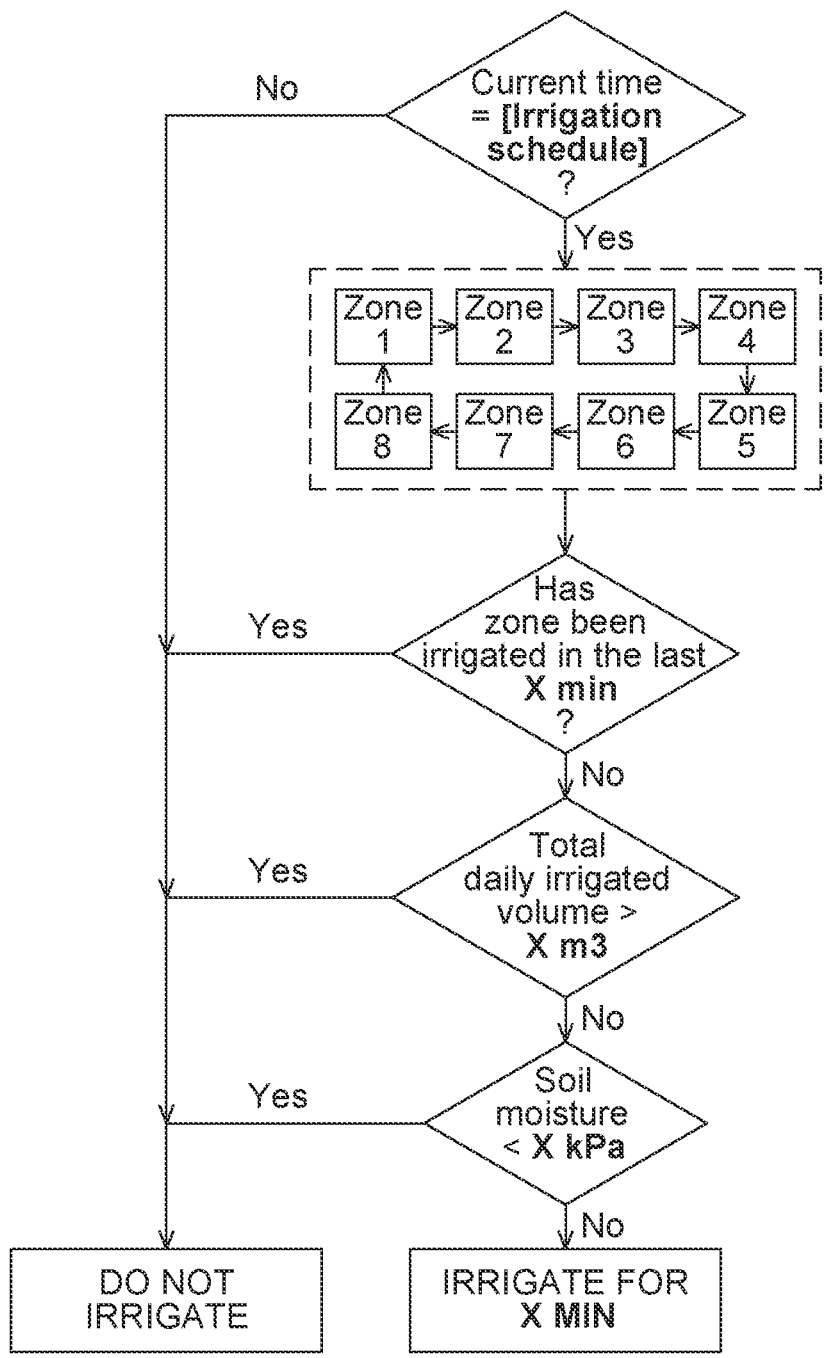
FIG. 5 is a schematic representation of an irrigation protocol that includes five selected parameters.

Referring to FIG. 5, in some implementations, the irrigation protocol can include a selection of parameters among the prior irrigation time, the total daily irrigated volume, the rainfall intensity, the forecasted rainfall intensity, and the soil moisture. In the implementation shown in FIG. 5, the selected parameters include the prior irrigation time, the total daily irrigated volume and the soil moisture. In such implementations, the controller can be configured to maintain the operation of the pump and associated irrigation network in standby, such that no irrigation event is initiated, when at least one of:
- the start irrigation time is outside of the irrigation schedule;
- the total daily irrigated volume is equal or above an irrigation volume threshold;
- the prior irrigation time is less than a given number of minutes, which can be interpreted as meaning that the number of minutes following the end of the prior irrigation event is less than a predetermined delay between two successive irrigation events corresponding to the soaking time; and
- the soil water tension of the irrigation zone is below a DUL-related criterion.

Still referring to the implementation shown in FIG. 5, the controller can be further configured to operate the pump and associated irrigation network to initiate an irrigation event having a given irrigation duration, when the following criteria are met:
- the start irrigation time is within the irrigation schedule;
- the prior irrigation time is equal to or more than a given number of minutes, which can be interpreted as meaning that the number of minutes following the end of the prior irrigation event is equal or more than the soaking time;
- the total daily irrigated volume is below the irrigation volume threshold; and
- the soil water tension of the irrigation zone is equal or above a DUL-related criterion.

In the case of the scenario presented in FIG. 5, no irrigation event is thus initiated if the irrigation start time is outside the irrigation schedule, the soil water tension at the start irrigation time is below the DUL-related criterion, or if the irrigation volume threshold has been reached, and an irrigation event can be initiated if the start irrigation time is within the irrigation schedule and the irrigation volume threshold has not been reached, as long as the soil water tension of the irrigation zone is equal or above a DUL-related criterion.

Figure 6:
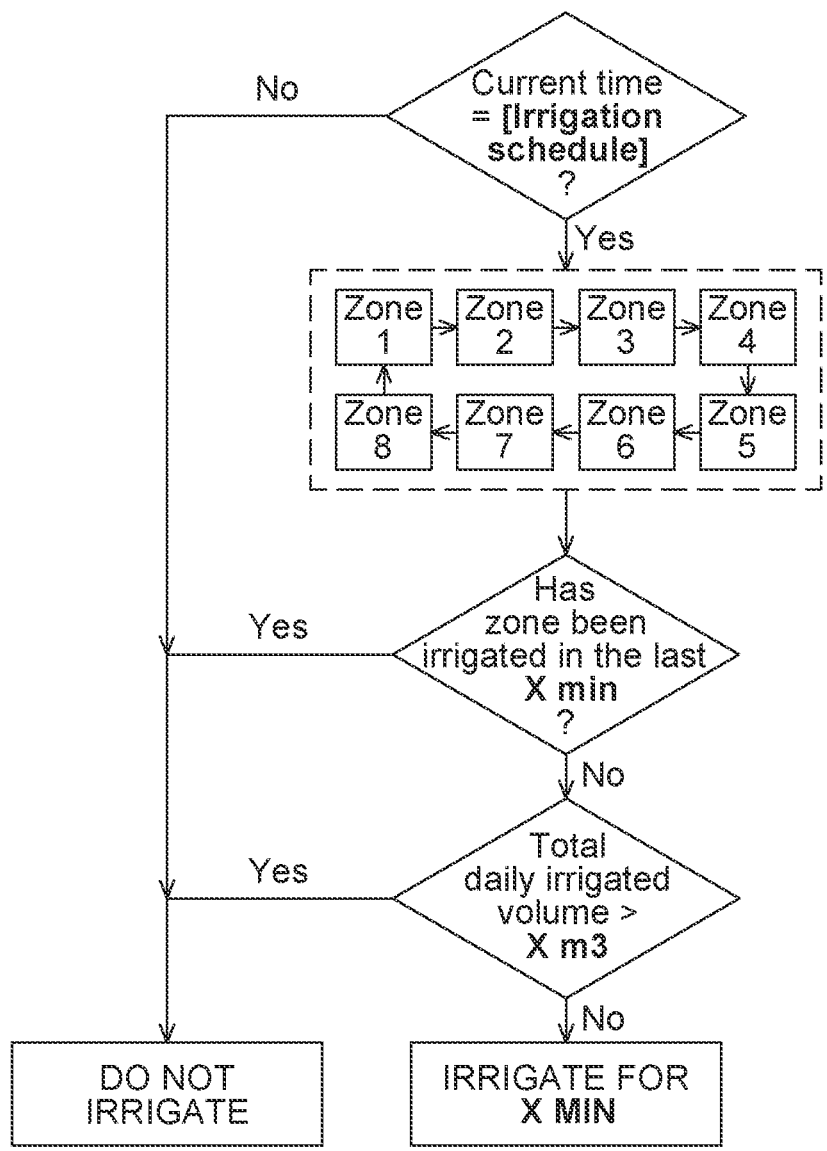
FIG. 6 is a schematic representation of an irrigation protocol that includes four selected parameters.

In the implementation shown in FIG. 6, the selected parameter is the total daily irrigated volume. In such implementations, the controller can be configured to maintain the operation of the pump and associated irrigation network in standby, such that no irrigation event is initiated, when at least one of:
- the start irrigation time is outside of the irrigation schedule;
- the prior irrigation time is less than a given number of minutes, which can be interpreted as meaning that the number of minutes following the end of the prior irrigation event is less than a predetermined delay between two successive irrigation events corresponding to the soaking time; and the total daily irrigated volume is equal to or above an irrigation volume threshold.

Still referring to the implementation shown in FIG. 6, the controller can be further configured to operate the pump and associated irrigation network to initiate an irrigation event having a given irrigation duration, when the following criteria are met:
 the start irrigation time is within the irrigation schedule;
 the prior irrigation time is equal to or more than a given number of minutes, which can be interpreted as meaning that the number of minutes following the end of the prior irrigation event is equal or more than the soaking time; and
 the total daily irrigated volume is below the irrigation volume threshold.

In the case of the scenario presented in FIG. 6, no irrigation event is initiated if the irrigation start time is outside the irrigation schedule or if the irrigation volume threshold has been reached, and an irrigation event can be initiated if the irrigation start time is within the irrigation schedule and the irrigation volume threshold has not been reached.

The scenarios illustrated in FIGS. 2-6 are examples of irrigation protocols that can be implemented to control the irrigation of an irrigation zone. It is to be understood that in other implementations, an irrigation protocol in accordance with the techniques described herein can include parameters that are different than those exemplified above, or can include additional parameters.

In the scenarios presented above, when the vegetated land includes more than one irrigation zone and it is desired to irrigate the irrigation zones sequentially rather than simultaneously, the controller can be further configured to apply an additional criterion to determine the sequence of irrigation of the irrigation zones. In some implementations, the criterion applied can be that the irrigation zone having the largest differential of its soil water content measurement above its DUL-related criterion is irrigated first, the irrigation zone having the second largest differential of its soil water content measurement above its DUL-related criterion is irrigated second, etc., until the irrigation zones of the vegetated land have all been irrigated. In some implementations, the irrigation zones having the largest differentials of their soil water content measurement above their respective DUL-related criterion can be grouped together to be subjected to an irrigation event. Multiple scenarios are thus possible depending on the irrigation protocol chosen and the configuration of the irrigation network.

In accordance with another aspect of the present description, there is provided a non-transitory computer readable storage medium having stored thereon computer executable instructions that, when executed by a processor, cause the controller or processor to perform the methods that have been previously described. The non-transitory computer storage medium can be integrated to the systems or assemblies that have been described in the present description. The non-transitory computer storage medium could otherwise be operatively connected with the systems or assemblies. In the present description, the terms "computer readable storage medium" and "computer readable memory" are intended to refer to a non-transitory and tangible computer product that can store and communicate executable instructions for the implementation of various steps of the method disclosed herein. The computer readable memory can be any computer data storage device or assembly of such devices, including random-access memory (RAM), dynamic RAM, read-only memory (ROM), magnetic storage devices such as hard disk drives, solid state drives, floppy disks and magnetic tape, optical storage devices such as compact discs (CDs or CDROMs), digital video discs (DVD) and Blu-Ray™ discs; flash drive memory, and/or other non-transitory memory technologies. A plurality of such storage devices may be provided, as can be understood by those skilled in the art. The computer readable memory may be associated with, coupled to, or included in a computer or processor configured to execute instructions contained in a computer program stored in the computer readable memory and relating to various functions associated with the computer.

In some implementations, at least one step of the proposed processes or methods may be implemented as software instructions and algorithms, stored in computer memory and executed by processors. It should be understood that computers may be used, in these implementations, to implement to proposed system, and to execute the proposed method. In other words, the skilled reader will readily recognize that steps of various above-described processes or methods can be performed by programmed computers. In view of the above, some implementations are also intended to cover program storage devices, e.g., digital data storage media, which are machine or computer readable and encode machine-executable or computer-executable programs of instructions, wherein said instructions perform some or all of the steps of said above-described methods. The implementations are also intended to cover computers programmed to perform said steps of the above-described methods.

Several alternative implementations and examples have been described and illustrated herein. The implementations of the technology described above are intended to be exemplary only. A person of ordinary skill in the art would appreciate the features of the individual implementations, and the possible combinations and variations of the components. A person of ordinary skill in the art would further appreciate that any of the implementations could be provided in any combination with the other implementations disclosed herein. It is understood that the technology may be embodied in other specific forms without departing from the central characteristics thereof. The present implementations and examples, therefore, are to be considered in all respects as illustrative and not restrictive, and the technology is not to be limited to the details given herein. Accordingly, while the specific implementations have been illustrated and described, numerous modifications come to mind.

The invention claimed is:

1. A system for controlling irrigation of wastewater onto a vegetated land comprising an irrigation zone, the system comprising:
 a pumping station comprising a pump in fluid communication with a wastewater source for supplying the wastewater to the irrigation zone;
 an irrigation network in fluid communication with the pump for supplying a volume of the wastewater to the irrigation zone;
 a control station comprising:
  a controller operatively connectable to the pump; and
  a soil water tension measuring device for measuring a soil water tension of the irrigation zone, the soil water tension measuring device being operatively connected to the controller to transmit data from the soil water tension measuring device to the controller;
  wherein the controller is configured to evaluate the soil water tension with respect to a DUL-related criterion and to initiate an irrigation event having a given volume of wastewater when the soil water tension measurement of the irrigation zone is equal to or above the DUL-related criterion, the given volume of wastewater being determined so as to maximize an amount of the wastewater applied to the vegetated land over time.

2. The system of claim 1, wherein the controller is configured to provide instruction to the pump regarding an irrigation duration of the irrigation event.

3. The system of claim 1, wherein the irrigation network further comprises an in-line pressure sensor configured to measure an upstream pressure of the irrigation network and/or to monitor hydraulic properties of the irrigation network.

4. The system of claim 3, wherein the in-line pressure sensor is operatively connectable to the pump to stop operation of the pump when the upstream pressure is above or below a given pressure threshold.

5. The system of claim 1, wherein the irrigation network further comprises a flowmeter configured to measure a flow of wastewater flowing in the irrigation network and/or a volume of irrigated wastewater supplied to the irrigation zone.

6. The system of claim 1, wherein the irrigation network further comprises an irrigation valve provided upstream of the irrigation zone, the irrigation valve being configured to modulate the given volume of wastewater supplied to the irrigation zone.

7. The system of claim 1, further comprising a weather station comprising a weather monitoring instrument.

8. The system of claim 7, wherein the weather monitoring instrument is a rain gauge to measure a rainfall intensity, the rain gauge being operatively connected to the controller, and the controller is further configured to adjust the given volume of wastewater supplied to the irrigation zone in accordance with the rainfall intensity.

9. The system of claim 1, wherein the controller is further configured to process at least one signal generated by a weather station and/or at least one signal generated by the pumping station.

10. The system of claim 1, further comprising a memory configured to store information representative of at least one of a past irrigation status of the irrigation zone, an ongoing irrigation status of the irrigation or a forecasted irrigation status of the irrigation zone.

11. The system of claim 10, wherein the memory is integrated to the controller, is in data communication with the controller, and is further configured to store calibration data.

12. The system of claim 11, wherein the calibration data is representative of control parameters of the pumping station and/or the soil tension measuring device.

13. The system of claim 1, further comprising a prediction module in data communication with the control station, the prediction module being configured to output an estimate of the soil water tension based on information representative of at least one of weather conditions, actual soil tension or hydraulic loading to be applied.

14. The system of claim 13, wherein the estimate of the soil water tension is representative of an instantaneous soil water tension.

15. A controller for a system for controlling irrigation of wastewater onto a vegetated land, the vegetated land comprising an irrigation zone, the controller being in data communication with a pumping station comprising a pump, the controller being configured to:
  determine a soil water tension of the irrigation zone with respect to a DUL-related criterion; and
  send instructions to the pump of the pumping station to initiate an irrigation event having a given volume of wastewater when the soil water tension measurement of the irrigation zone is equal to or above the DUL-related criterion, the given volume of wastewater being determined so as to maximize an amount of the wastewater applied to the vegetated land over time.

16. The controller of claim 15, wherein the controller is further configured to obtain data from the pumping station and to process at least one signal generated by the pumping station.

17. The controller of claim 15, wherein the controller is further configured to obtain data from a weather monitoring instrument of a weather station and to process at least one signal generated by the weather station.

18. The controller of claim 15, wherein the controller is operatively connectable to a rain gauge, and the controller is further configured to adjust the given volume of wastewater supplied to the irrigation zone in accordance with a rainfall intensity.

19. The controller of claim 15, further comprising a memory configured to store information representative of at least one of a past irrigation status of the irrigation zone, an ongoing irrigation status of the irrigation or a forecasted irrigation status of the irrigation zone.

20. The controller of claim 19, wherein the memory is further configured to store calibration data representative of control parameters of the pumping station and/or of a soil tension measuring device.

* * * * *